(12) United States Patent
Chae et al.

(10) Patent No.: US 8,455,046 B2
(45) Date of Patent: Jun. 4, 2013

(54) THIN FILM PATTERNING APPARATUS AND METHOD OF FABRICATING COLOR FILTER ARRAY SUBSTRATE USING THE SAME

(75) Inventors: Gee Sung Chae, Incheon (KR); Gyoo Chul Jo, Gyeonggi-do (KR); Yong Sup Hwang, Gyeonggi-do (KR); Jin Wuk Kim, Gyeonggi-do (KR); Chang Hee Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 136 days.

(21) Appl. No.: 12/841,680

(22) Filed: Jul. 22, 2010

(65) Prior Publication Data

US 2010/0291296 A1 Nov. 18, 2010

Related U.S. Application Data

(62) Division of application No. 11/165,051, filed on Jun. 24, 2005, now Pat. No. 7,785,504.

(30) Foreign Application Priority Data

Nov. 11, 2004 (KR) .......................... 10-2004-0092132
Nov. 11, 2004 (KR) .......................... 10-2004-0092133

(51) Int. Cl.
*B05D 5/06* (2006.01)
(52) U.S. Cl.
USPC ........................................ 427/162; 427/133
(58) Field of Classification Search
USPC ................................................. 427/162, 133
See application file for complete search history.

(56) References Cited

U.S. PATENT DOCUMENTS

| | | | |
|---|---|---|---|
| 6,154,265 A | 11/2000 | Kamio et al. | |
| 8,293,161 B2 * | 10/2012 | Chae et al. | 264/293 |
| 2003/0090609 A1 | 5/2003 | Inoue et al. | |
| 2004/0095521 A1 | 5/2004 | Song et al. | |
| 2004/0169807 A1 * | 9/2004 | Rho et al. | 349/139 |
| 2004/0223101 A1 | 11/2004 | Yeh et al. | |
| 2004/0229140 A1 | 11/2004 | Kim | |
| 2004/0266307 A1 | 12/2004 | McCoy et al. | |

(Continued)

FOREIGN PATENT DOCUMENTS

| | | |
|---|---|---|
| CN | 1484071 | 3/2004 |
| EP | 1333315 | 1/2003 |

(Continued)

OTHER PUBLICATIONS

"A Soft-imprint technique for submicron structure fabrication via in situ polymerization"; Choi et al.; Nanotachnoloty, 2004, vol. 15, S135-138.

(Continued)

*Primary Examiner* — Elizabeth Burkhart
(74) *Attorney, Agent, or Firm* — McKenna Long & Aldridge, LLP

(57) ABSTRACT

A fabricating method of a color filter array substrate includes the steps of forming a black matrix on a substrate, forming red, green, blue color filters on the substrate on which the black matrix is formed, forming an overcoat layer including a white color filter on the substrate on which the red, green, and blue color filters are formed, aligning a flat panel soft mold to the overcoat layer; and smoothing the overcoat layer using the flat panel soft mold.

5 Claims, 59 Drawing Sheets

U.S. PATENT DOCUMENTS

| | | | |
|---|---|---|---|
| 2005/0042797 A1* | 2/2005 | Lin | 438/70 |
| 2005/0068487 A1* | 3/2005 | Hsieh et al. | 349/155 |
| 2005/0117092 A1 | 6/2005 | Park et al. | |
| 2005/0231669 A1 | 10/2005 | Kim | |
| 2006/0066777 A1 | 3/2006 | Kim et al. | |
| 2006/0108905 A1 | 5/2006 | Cho et al. | |

FOREIGN PATENT DOCUMENTS

| | | | |
|---|---|---|---|
| JP | 53-033201 | | 3/1978 |
| JP | 03-063628 | | 3/1991 |
| JP | 04-324803 | * | 11/1992 |
| JP | 4324803 | | 11/1992 |
| JP | H04-324803 A | | 11/1992 |
| JP | 06-281936 | | 10/1994 |
| JP | H06-281926 A | | 10/1994 |
| JP | 11-202116 A | | 7/1999 |
| JP | 11295717 | | 10/1999 |
| JP | 2003-123639 A | | 4/2003 |
| JP | 2004-004822 A | | 1/2004 |
| KR | 2003057208 | * | 7/2003 |
| KR | 10-2004-0059323 | | 7/2004 |
| KR | 10-2004-0060244 | | 7/2004 |
| KR | 1020040079566 | | 9/2004 |

OTHER PUBLICATIONS

"Soft Lithography"; Xia, et al; Agnew.Chem. Int. Ed. 1998,37, 550-575.

* cited by examiner

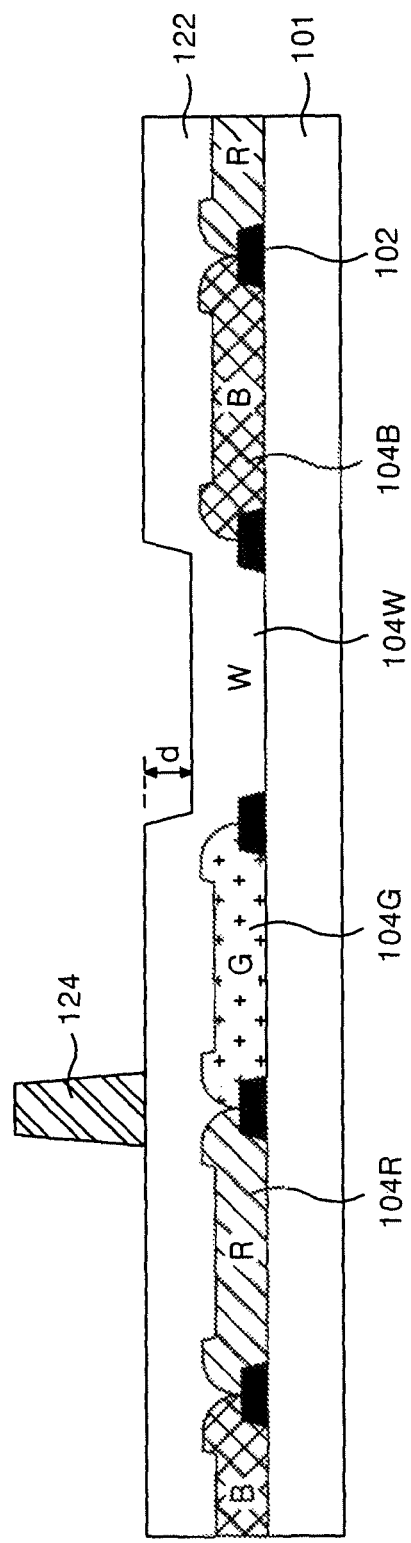

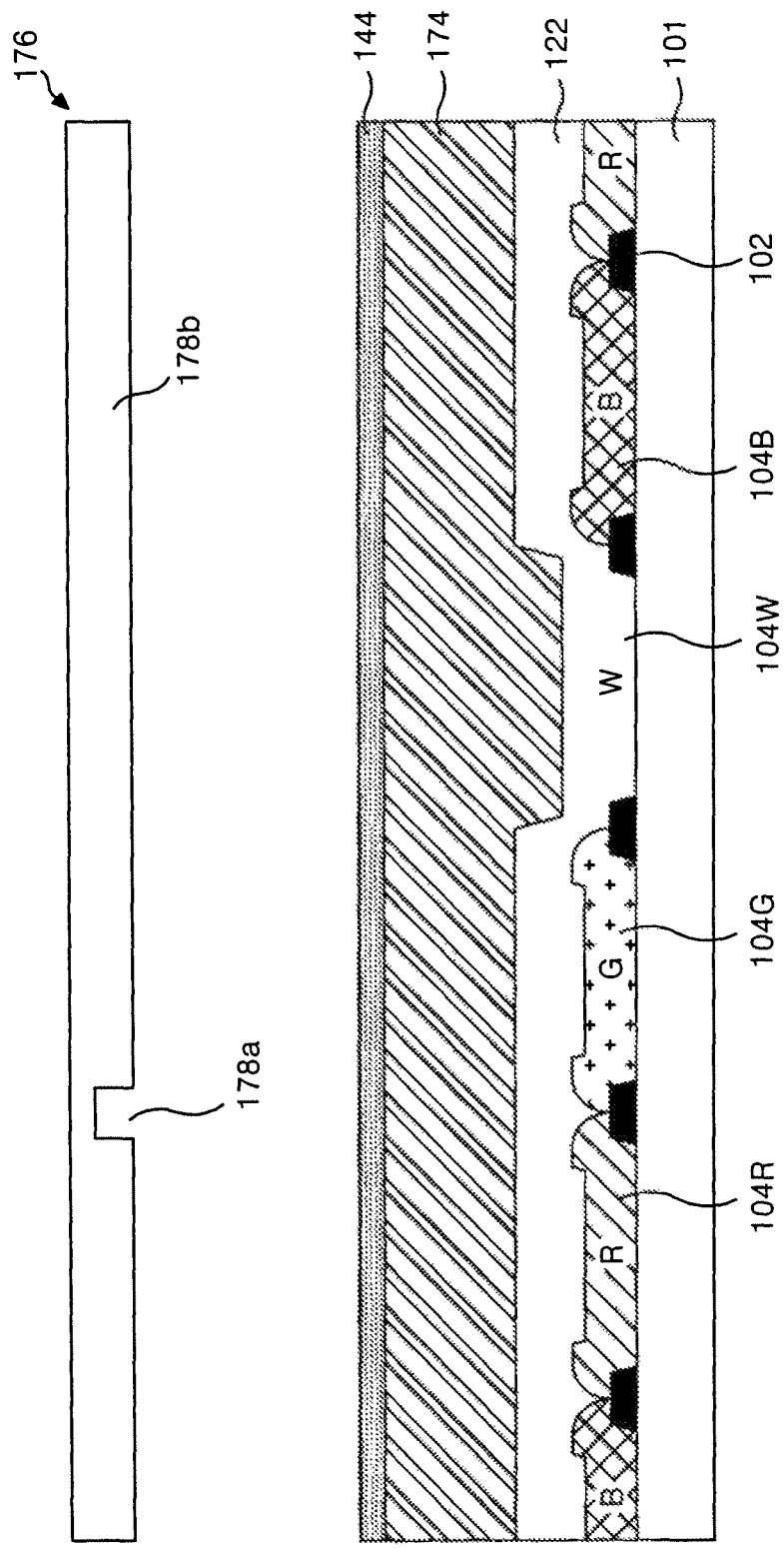

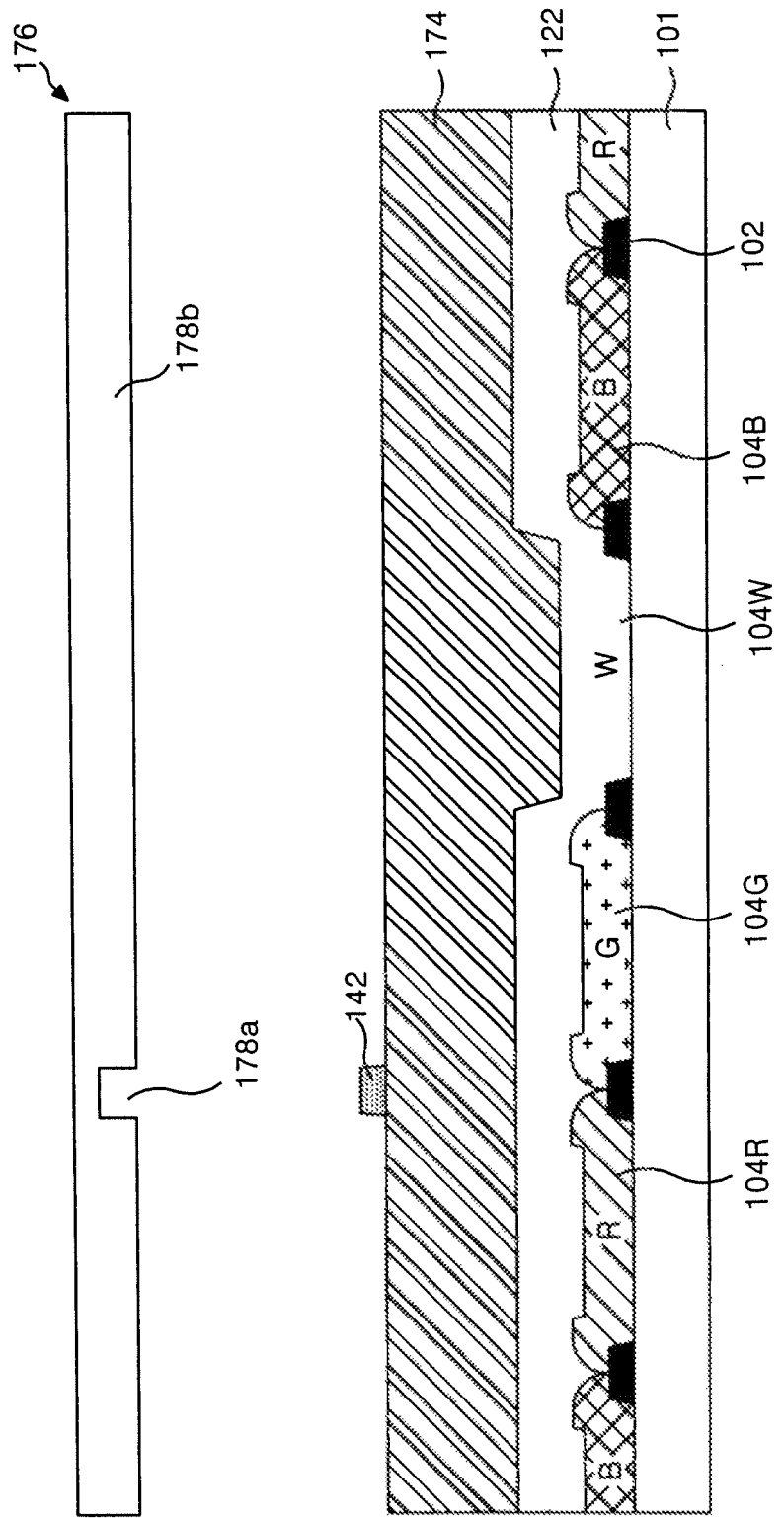

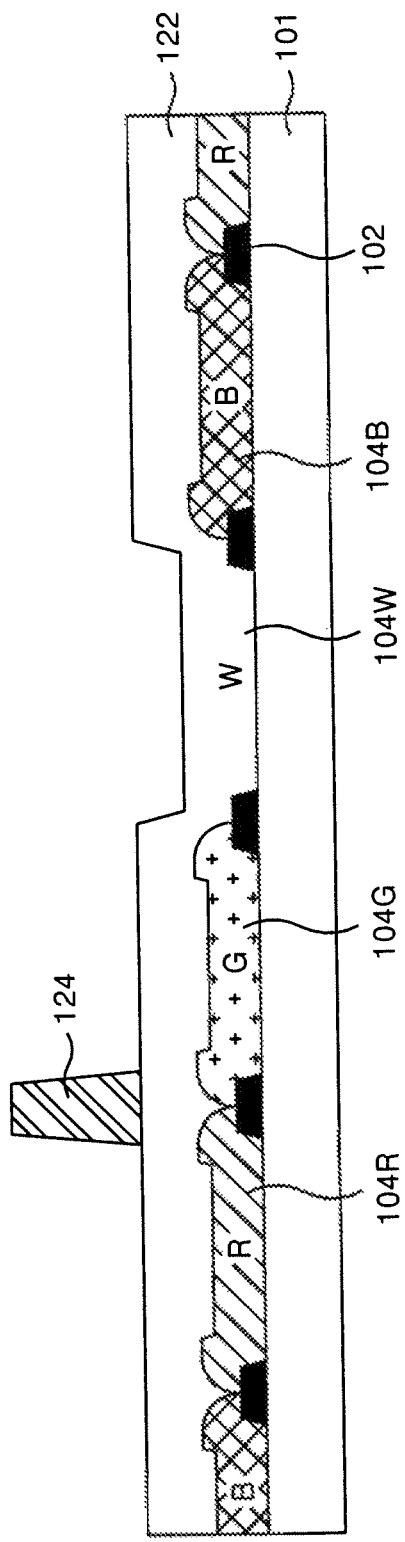

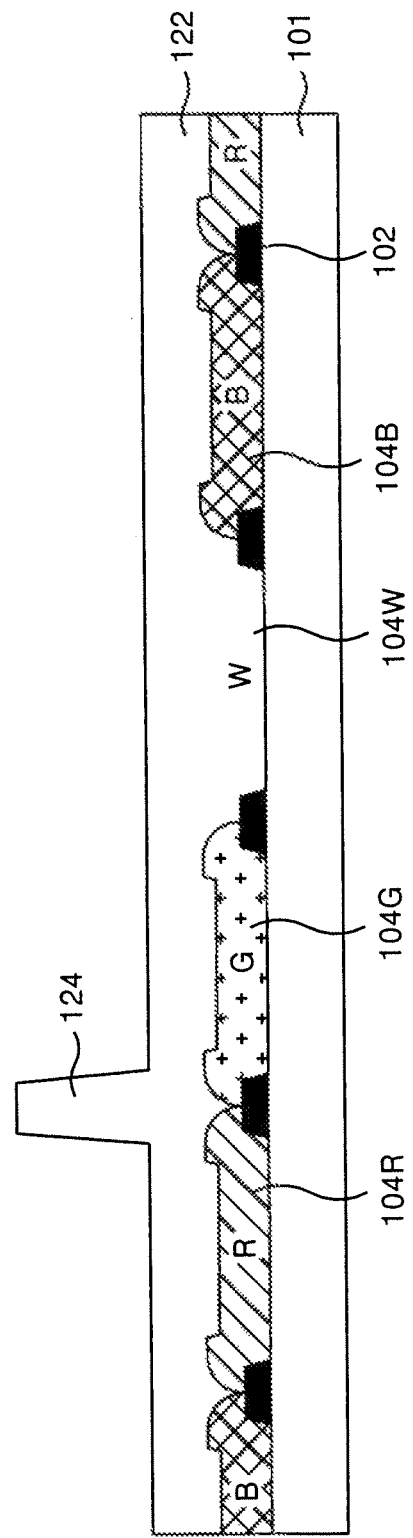

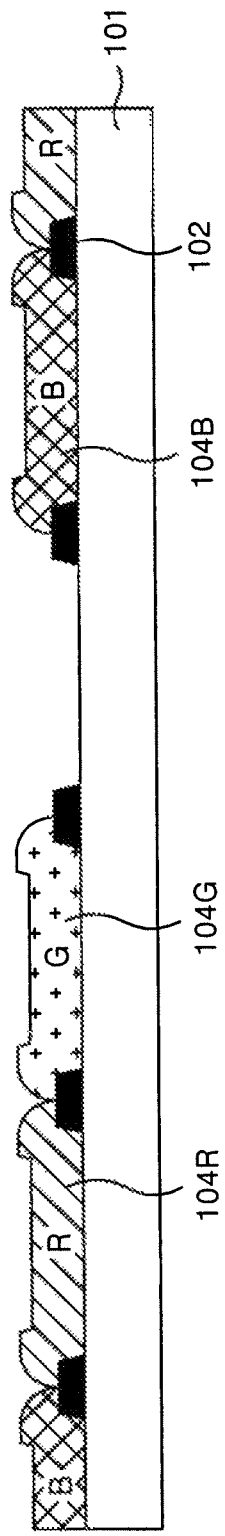

THIN FILM PATTERNING APPARATUS AND METHOD OF FABRICATING COLOR FILTER ARRAY SUBSTRATE USING THE SAME

CROSS-REFERENCE TO RELATED APPLICATIONS

This application is a Divisional of application Ser. No. 11/165,051, filed Jun. 24, 2005, now U.S. Pat. No. 7,785,504 which claims priority to Korean Patent Application Nos. 10-2004-0092132 and 10-2004-0092133, filed Nov. 11, 2004, all of which are hereby incorporated by reference for all purposes as if fully set forth herein.

BACKGROUND OF THE INVENTION

1. Field of the Invention

The present invention relates to a liquid crystal display device, and more particularly to a thin film patterning apparatus and method of fabricating color filter array substrate using the same. Although the present invention is suitable for a wide scope of applications, it is particularly suitable for a thin film patterning apparatus that can perform a patterning process without using a photolithography process.

2. Description of the Related Art

Generally, a liquid crystal display (LCD) controls the light transmissivity of liquid crystal by use of an electric field, thereby displaying a picture. The liquid crystal display device includes a liquid crystal display panel in which liquid crystal cells are arranged in a matrix form, and a driving circuit for driving the liquid crystal display panel. In the liquid crystal display panel, a reference electrode, such as a common electrode, and pixel electrodes are provided for applying the electric field to each of the liquid crystal cells. Generally, the pixel electrodes are formed on a lower substrate in individual liquid crystal cells, and the common electrode is integral and formed over the entire surface of the upper substrate. The pixel electrodes are connected to thin film transistors TFT, which are used as switching devices. The pixel electrodes along with the common electrode drives the liquid crystal in accordance with a data signal supplied through the TFT.

FIG. 1 is an expanded perspective view of a related art liquid crystal display panel. Referring to FIG. 1, the related art liquid crystal display panel includes a color filter array substrate 10 and a thin film transistor array substrate 20, which are bonded together. Liquid crystal molecules 8 are between the color filter array substrate 10 and the thin film transistor array substrate 20. The liquid crystal molecules 8 rotate in response to the data signal applied to it, thereby controlling the amount of light transmitted through the thin film transistor array substrate 20.

The color filter array substrate 10 includes a color filter 4, a black matrix 2 and a common electrode 6, which are formed on the rear surface of the upper substrate 1. The color filter 4 includes red (R), green (G) and blue (B) color filters to enable a full color display. The black matrix 2 is formed between the adjacent color filters 4 to absorb the light from the adjacent cells, thereby preventing deterioration in the contrast.

The thin film transistor array substrate 20 has a data line 18 and a gate line 12, which are formed to cross each other. A gate insulating film (not shown) is formed over the gate line 12 and over the entire surface of a lower substrate 21. A TFT 16 is formed adjacent to where the data line 18 and the gate line 12 cross. The TFT 16 includes a gate electrode connected to the gate line 12, a source electrode connected to the data line 18, a drain electrode connected to the pixel electrode 14 and an active layer with a channel part. The active layer contacts the source and drain electrodes with ohmic contact layers. The TFT 16 selectively supplies a data signal from the data line 18 to the pixel electrode 14 in response to a gate signal from the gate line 12.

The pixel electrode 14 is located in a cell area that is defined by the data line 18 and the gate line 12, and is formed of a transparent conductive material with high light transmissivity. A potential difference is generated between the pixel electrode 14 and the common electrode 6 by a data signal supplied through the drain electrode. The potential difference causes liquid crystal molecules 8, which are located between the lower substrate 21 and the upper substrate 1, to rotate by dielectric anisotropy. Accordingly, the light supplied to the pixel electrode 14 from a light source is transmitted through the liquid crystal molecule 8 to the upper substrate 1.

Each pixel of the liquid crystal display panel shown in FIG. 1 includes a sub-pixel for realizing red (R), a sub-pixel for realizing green (G) and a sub-pixel for realizing blue (B). In the case of a pixel composed of R, G, B sub-pixels, only about 27%~33% of the light emitted from a backlight is transmitted through the color filter 4. In order to solve such a problem, a color filter array substrate of the liquid crystal display panel having a different sub-pixel arrangement has been proposed.

FIG. 2 is a cross-sectional diagram of the related art color filter array substrate having a white color filter. The color filter array substrate of the liquid crystal display panel shown in FIG. 2 has red (R), green (G), blue (B) and white (W) sub-pixels 4R, 4G, 4W and 4B. In a liquid crystal display panel having the W sub-pixel, the amount of light emitted through the color filter 4 is greater than 85% of the light emitted from a backlight. Accordingly, the mean value of the light emitted from each pixel composed of the R, G, B, W sub-pixels is relatively high, thereby improving brightness.

FIGS. 3A to 3L are cross-sectional views representing a fabricating method of the related art color filter array substrate of the liquid crystal display panel shown in FIG. 2. First, an opaque layer 54, as shown in FIG. 3A, is formed on the upper substrate 1 by one of sputtering, spin coating and spin-less coating. The opaque layer 54 is an opaque resin or an opaque metal, such as chrome (Cr). Subsequently, a photo resist pattern 52 is formed on the opaque layer 54 by a photolithography process using a first mask 50 that defines an exposure area S1 and a shielding area S2. The opaque layer 54 is patterned by an etching process using the photo resist pattern 52, thereby forming a black matrix 2 on the upper substrate 1, as shown in FIG. 38.

A red resin 58, as shown in FIG. 3C, is spread over the whole surface of the upper substrate 1 on which the black matrix 2 is formed. Subsequently, the red resin 58 is patterned by a photolithography process using a second mask 56 that defines the exposure area S1 and the shielding area S2, thereby forming a red color filter 4R, as shown in FIG. 3D.

A green resin 60, as shown in FIG. 3E, is spread over the entire surface of the upper substrate 1 on which the red color filter 4R is formed. Subsequently, the green resin 60 is patterned by a photolithography process using a third mask 62 that defines the exposure area S1 and the shielding area S2, thereby forming a green color filter 4G, as shown in FIG. 3F.

A green resin 60, as shown in FIG. 3E, is spread over the entire surface of the upper substrate 1 on which the red color filter 4R is formed. Subsequently, the green resin 60 is patterned by a photolithography process using a third mask 62 that defines the exposure area S1 and the shielding area S2, thereby forming a green color filter 4G, as shown in FIG. 3F.

A blue resin 64, as shown in FIG. 3G, is spread on the entire surface of the upper substrate 1 on which the green color filter 4G is formed. Subsequently, the blue resin 64 is patterned by a photolithography process using a fourth mask 66 that defines the exposure area S1 and the shielding area S2, thereby forming a blue color filter 4B, as shown in FIG. 3H.

A white resin 68, as shown in FIG. 3I, is spread over the entire surface of the upper substrate 1 on which the blue color filter 4B is formed. The white resin 68 is an organic insulating material including an acrylic resin. Subsequently, the white resin 68 is patterned by a photolithography process using a fifth mask 70 that defines the exposure area S1 and the shielding area S2, thereby forming a white color filter 4W, as shown in FIG. 3J.

An organic insulating material is spread over the upper substrate 1 on which the white color filter 4W is formed, thereby forming an overcoat layer 22, as shown in FIG. 3K. Then, an organic material 76 is spread over the entire surface of the overcoat layer 22 on the upper substrate 1. Subsequently, the photo resist pattern 74 is formed by a photolithography using a sixth mask 72 that defines the exposure area S1 and the shielding area S2. The organic material 76 is patterned by the photo resist pattern 74, thereby forming a spacer 24, as shown in FIG. 3L.

A six mask process is required for forming the color filter array substrate shown in FIG. 2. In this case, costs are high because the fabrication process is complicated. Thus, there is a need for reducing manufacturing costs by simplifying the fabricating process.

FIG. 4 is an expanded perspective view representing a related art vertical alignment type liquid crystal display panel. The liquid crystal display device shown in FIG. 4 can realize a multi-domain by making the liquid crystal have several arrangement directions by using a rib 34. That is, in the vertical alignment type liquid crystal display panel shown in FIG. 4, the electric field applied to the liquid crystal is distorted by the rib 34, so that the liquid crystal is arranged in symmetric directions centered on the rib 34, thus the viewing angle is broadened.

FIGS. 5A to 5E are cross-sectional views for a fabricating method of the color filter array substrate shown in FIG. 4. Referring to FIG. 5A, the black matrix 2 is formed on the upper substrate 1. After the opaque resin or the opaque metal is spread over the upper substrate 1, the black matrix 2 is formed by patterning the opaque resin or the opaque metal by a photolithography process using a mask and etching process. The opaque resin can be, for example, carbon black, and the opaque metal can be, for example, chrome (Cr) or chrome oxide (CrOx/Cr/CrOx, CrOx/Cr/CrSix).

Referring to FIG. 5B, the color filter 4 is formed on the upper substrate 1 on which the black matrix 2 is formed. After each of red, greed and blue color resins is spread on the entire surface of the upper substrate 1 on which the black matrix 2 is formed, the color filter is formed by having each of the red, greed and blue color resins patterned by a photolithography process using a mask.

Referring to FIG. 5C, an overcoat layer 22 is formed over the upper substrate 1 on which the color filter 4 is formed. The overcoat layer 22 is formed by having a transparent insulating layer, such as acrylic resin or epoxy resin, spread over the entire surface of the upper substrate 1 on which the color filter 4 is formed.

Referring to FIG. 5D, a common electrode 6 is formed over the upper substrate 1 on which the overcoat layer 22 is formed. The common electrode 6 is formed by depositing a transparent conductive film, such as ITO or IZO, over the entire surface of the upper substrate 1 on which the overcoat layer is formed.

Referring to FIG. 5E, a rib 34 is formed over the upper substrate 1 on which the common electrode 6 is formed. After a polymer resin, such as acrylic resin or epoxy resin, is spread on the entire surface of the upper substrate 1 on which the common electrode 1 is formed, the rib 34 of polymer resin is formed by patterning through a photolithography process.

In the fabricating method of the related art vertical alignment type liquid crystal display panel, a plurality of patterns are formed by photolithography processes. The photolithography process is a series of photo processes including the steps of spreading photo resist, aligning masks, exposing and developing. The photolithography process has problems in that it requires along time, a developing solution for developing the photo resist and too much photo resist pattern is wasted, and expensive exposure equipment is required. Further, the process of forming the rib 34 and the process of forming the overcoat layer 22 are separately performed, thus there is a problem in that the fabricating process time and the cost increases.

SUMMARY OF THE INVENTION

Accordingly, the present invention is directed to a fabricating method of a color filter array substrate that substantially obviates one or more of the problems due to limitations and disadvantages of the related art.

An object of the present invention to provide to a fabricating method of a color filter array substrate that simplifies the fabrication process.

Another object of the present invention to provide a fabricating method of a color filter array substrate having an overcoat layer with a smooth surface.

Another object of the present invention to provide a thin film patterning apparatus that can perform a patterning process without using a photolithography process and a fabricating method of a color filter array substrate using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fabricating method of a color filter array substrate includes the steps of forming a black matrix on a substrate, forming red, green, blue color filters on the substrate on which the black matrix is formed, forming an overcoat layer including a white color filter on the substrate on which the red, green, and blue color filters are formed, aligning a flat panel soft mold to the overcoat layer, and smoothing the overcoat layer using the flat panel soft mold.

In another aspect, a fabricating method of a color filter array substrate includes the steps of forming a black matrix on a substrate, forming red, green, blue color filters on the substrate on which the black matrix is formed, coating a transparent resin over the substrate on which the red, green, blue color filters are formed, aligning a soft mold having a groove and a projection to an upper part of the substrate on which the transparent resin is formed, and simultaneously forming at least two of a white color filter, an overcoat layer and a spacer using the soft mold.

In another aspect, a fabricating method of a color filter array substrate includes the steps of forming a black matrix that defines pixel areas on a substrate, forming a color filter in the pixel areas, coating a transparent resin over the substrate where the color filter is formed, aligning a soft mold having a groove and a projection to an upper part of the substrate where the transparent resin is formed, and forming an overcoat layer by molding the transparent resin with the soft mold, and simultaneously forming a rib for each pixel area so that an arrangement direction of a liquid crystal is adjusted to be in a plurality of directions.

In another aspect, a thin film patterning apparatus for fabricating a color filter array substrate which has a black matrix for preventing light leakage, a color filter for realizing color, an overcoat layer for compensating a stepped difference by the color filter, and a rib simultaneously formed of the same material as the overcoat layer for adjusting an arrangement direction of a liquid crystal includes a soft mold which has a projected part formed at an area corresponding to the overcoat layer, and a groove formed at an area corresponding to the rib that projects from the overcoat layer.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings.

FIG. 3A to 3L are cross-sectional views representing a fabricating method of the related art color filter array substrate shown in FIG. 2.

FIG. 7 is a cross-sectional view of the color filter array substrate shown in FIG. 6.

FIGS. 14A to 14F are cross-sectional views for a fabricating method of the color filter array substrate shown in FIG. 13;

DETAILED DESCRIPTION OF THE PREFERRED EMBODIMENTS

Reference will now be made in detail to the preferred embodiments of the present invention, examples of which are illustrated in the accompanying drawings. Hereinafter, the preferred embodiments of the present invention will be described in detail with reference to FIGS. 6 to 17E.

Figure 1:
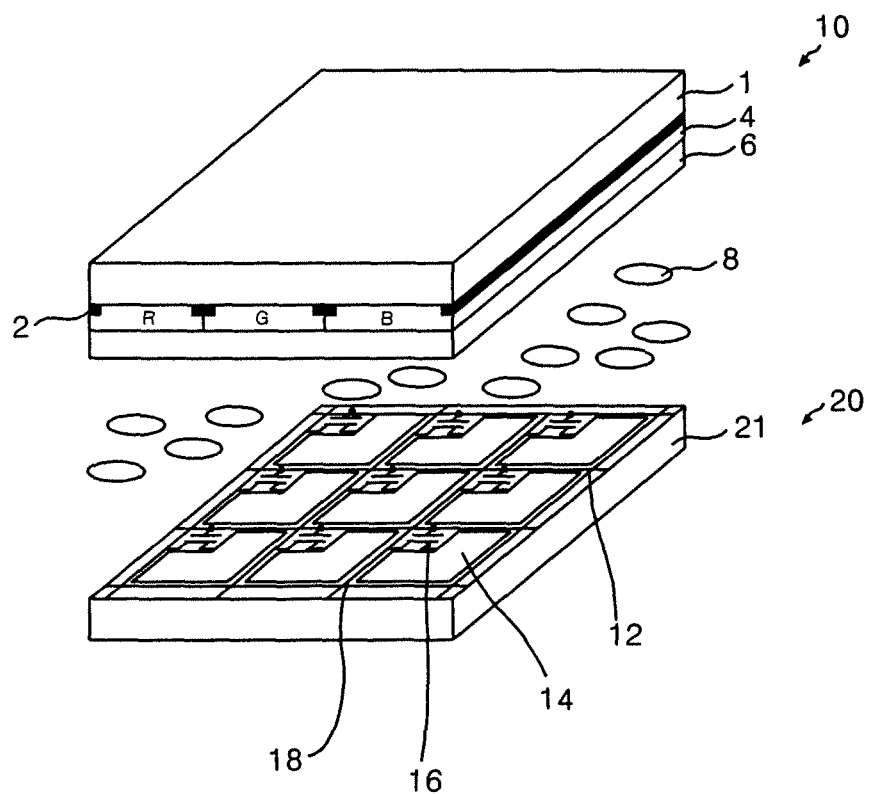
FIG. 1 is an expanded perspective view of a related art liquid crystal display panel.
Figure 2:
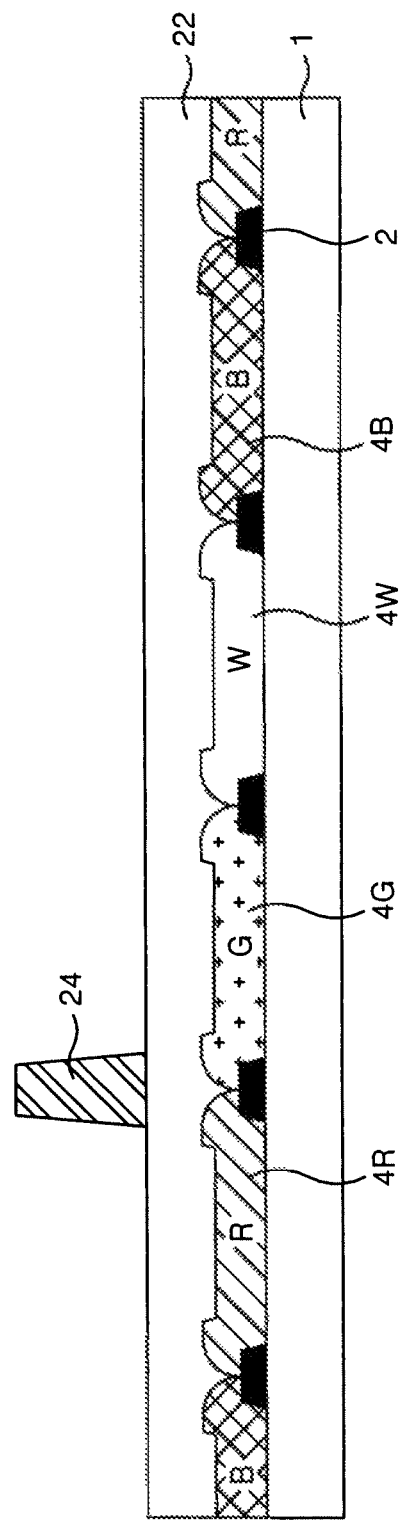
FIG. 2 is a cross-sectional view of a related art color filter array substrate having a white color filter.
Figure 3A:
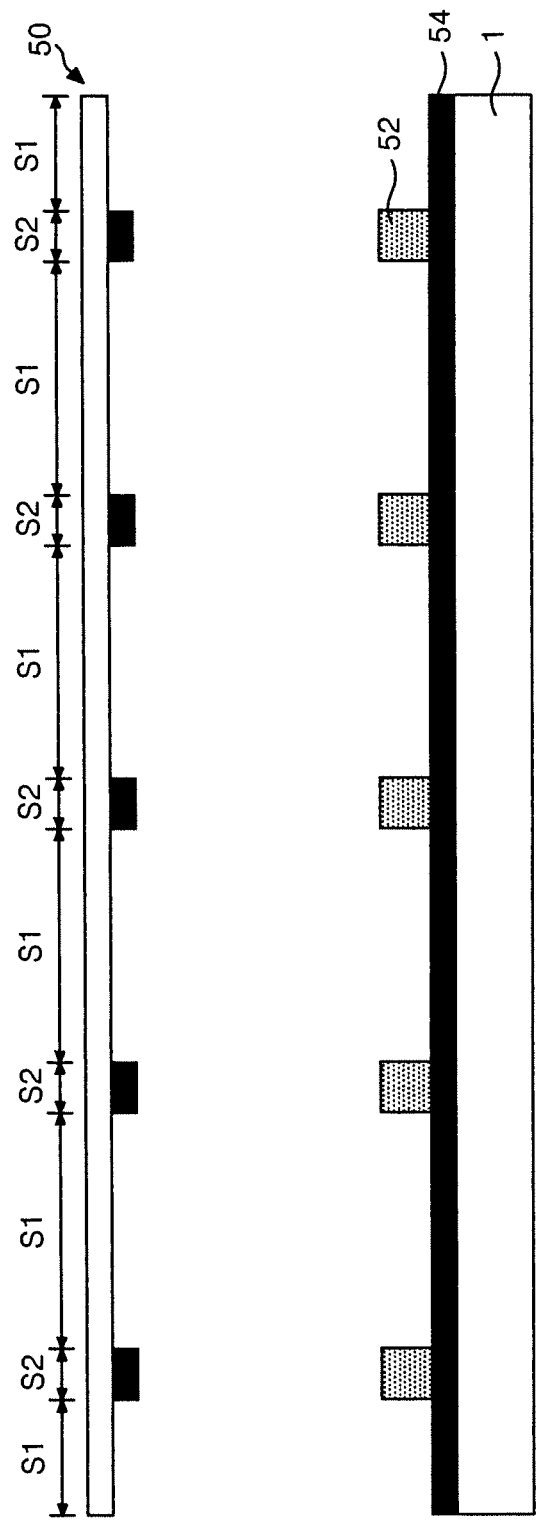
Figure 3B:
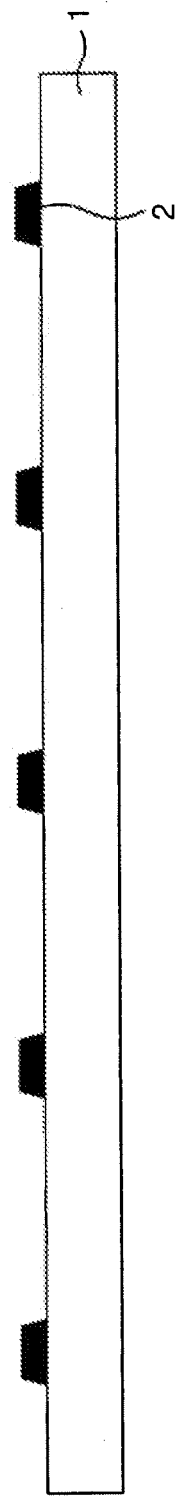
Figure 3C:
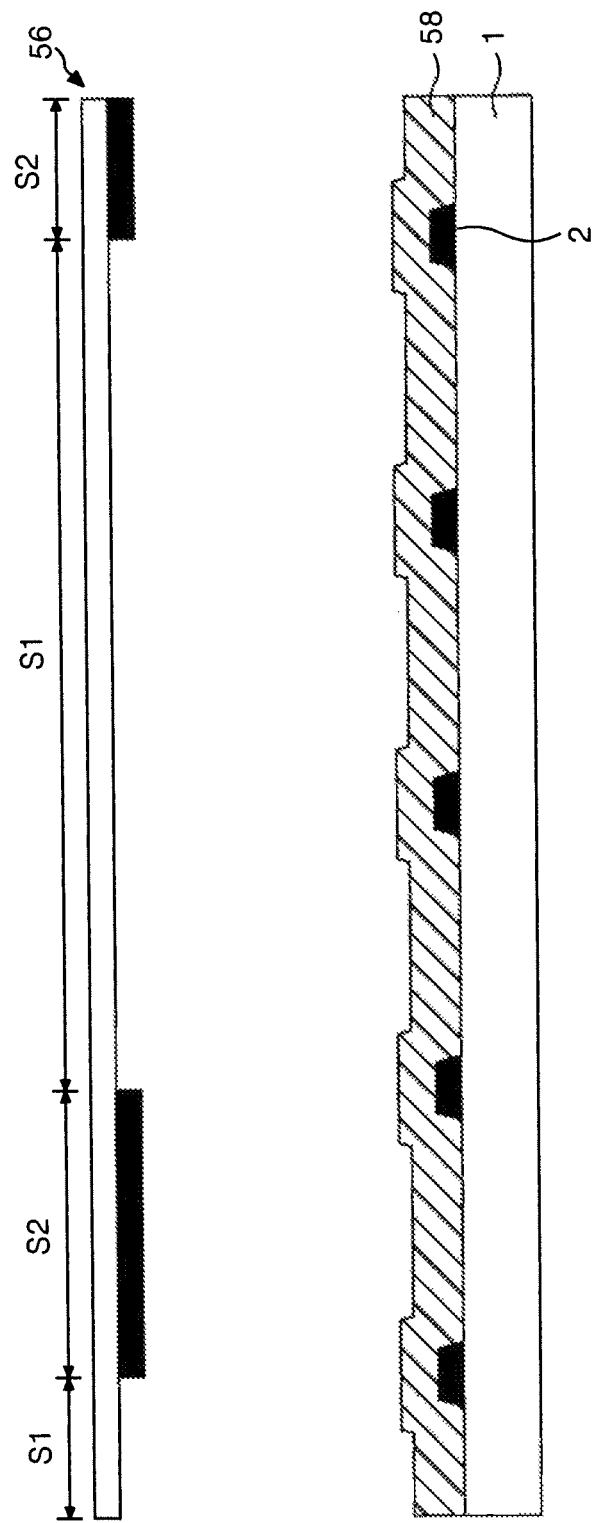
Figure 3D:
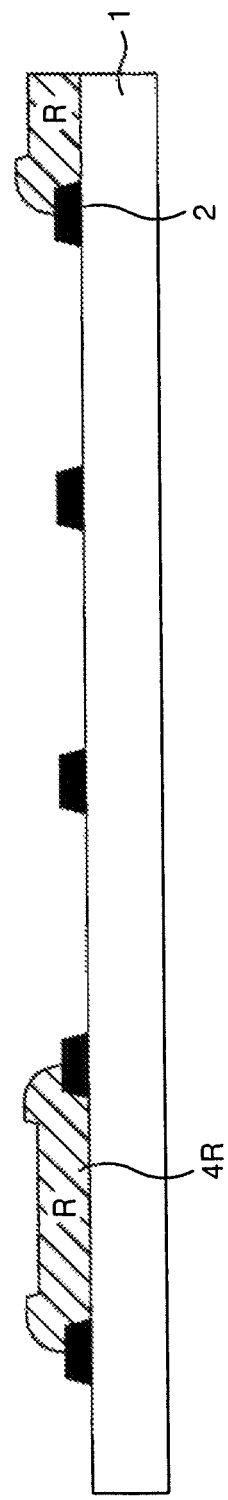
Figure 3E:
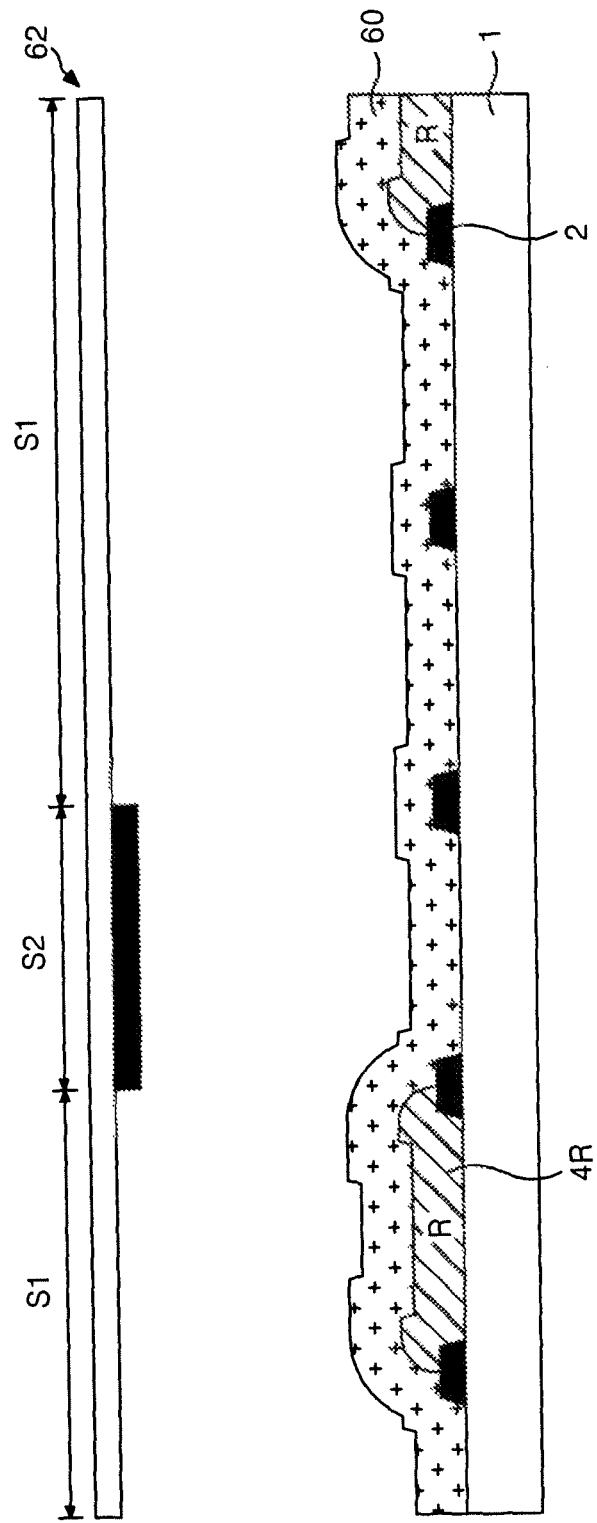
Figure 3F:
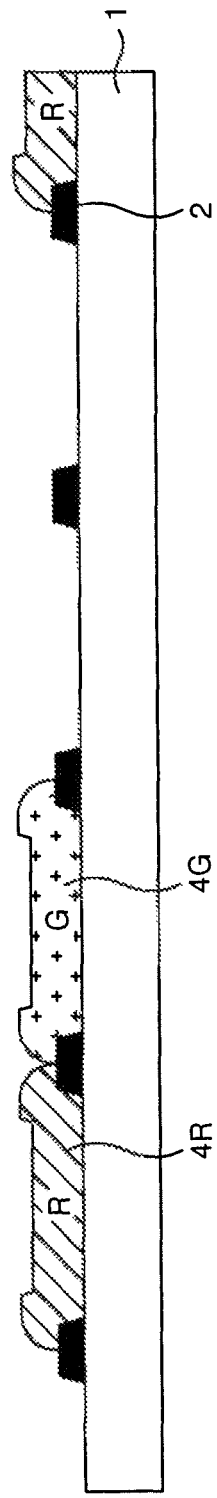
Figure 3G:
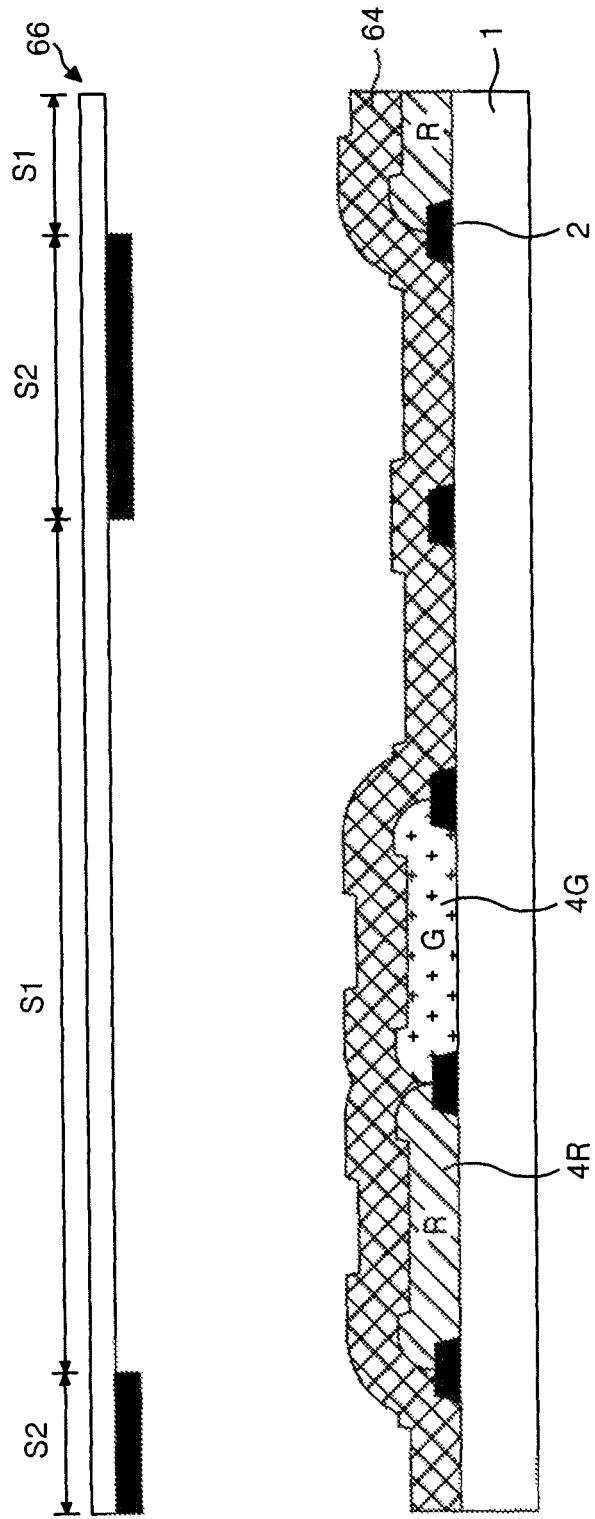
Figure 3H:
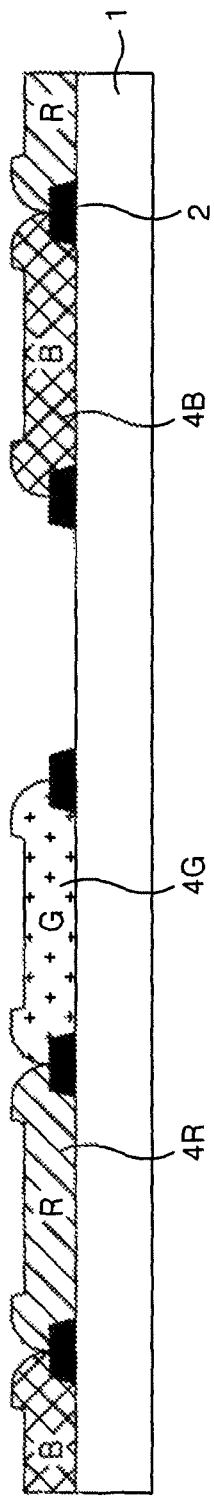
Figure 31:
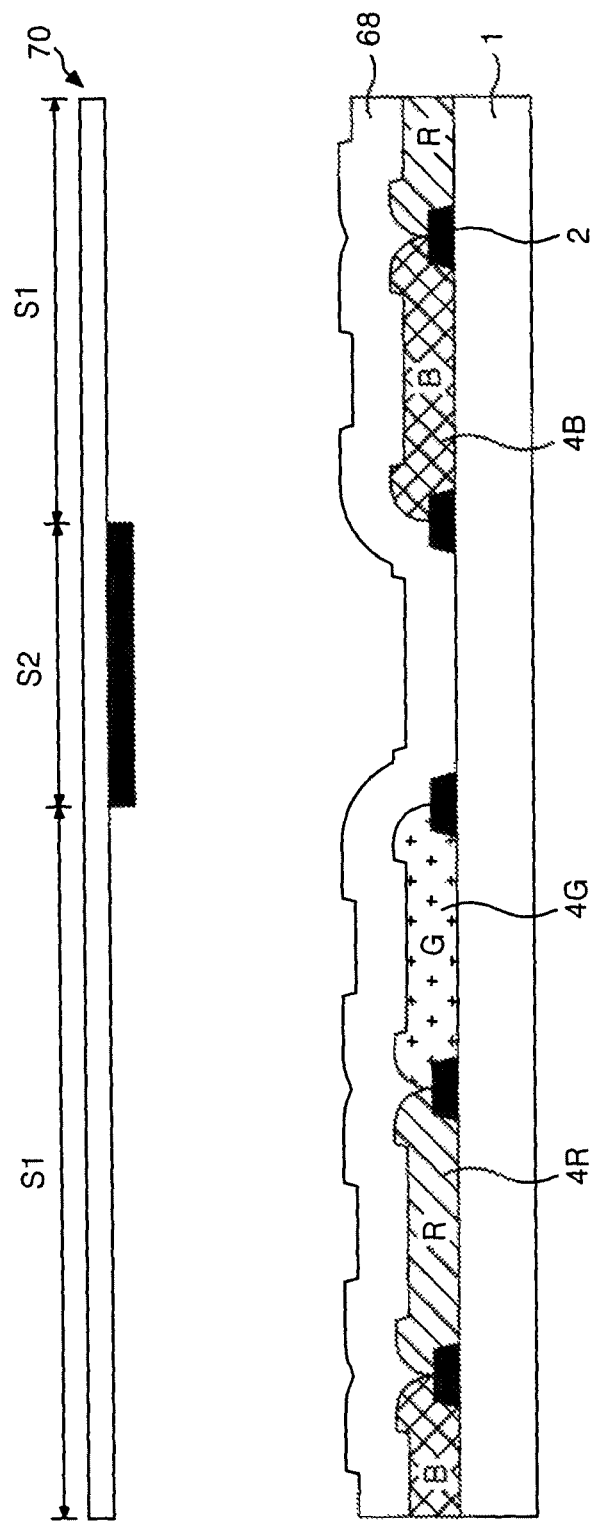
Figure 3J:
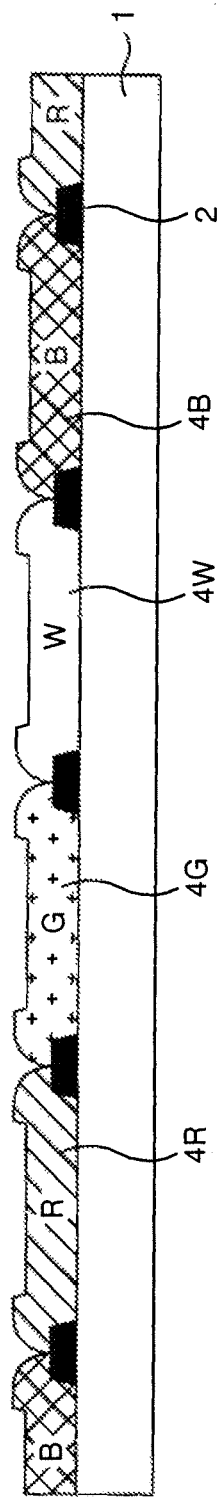
Figure 3K:
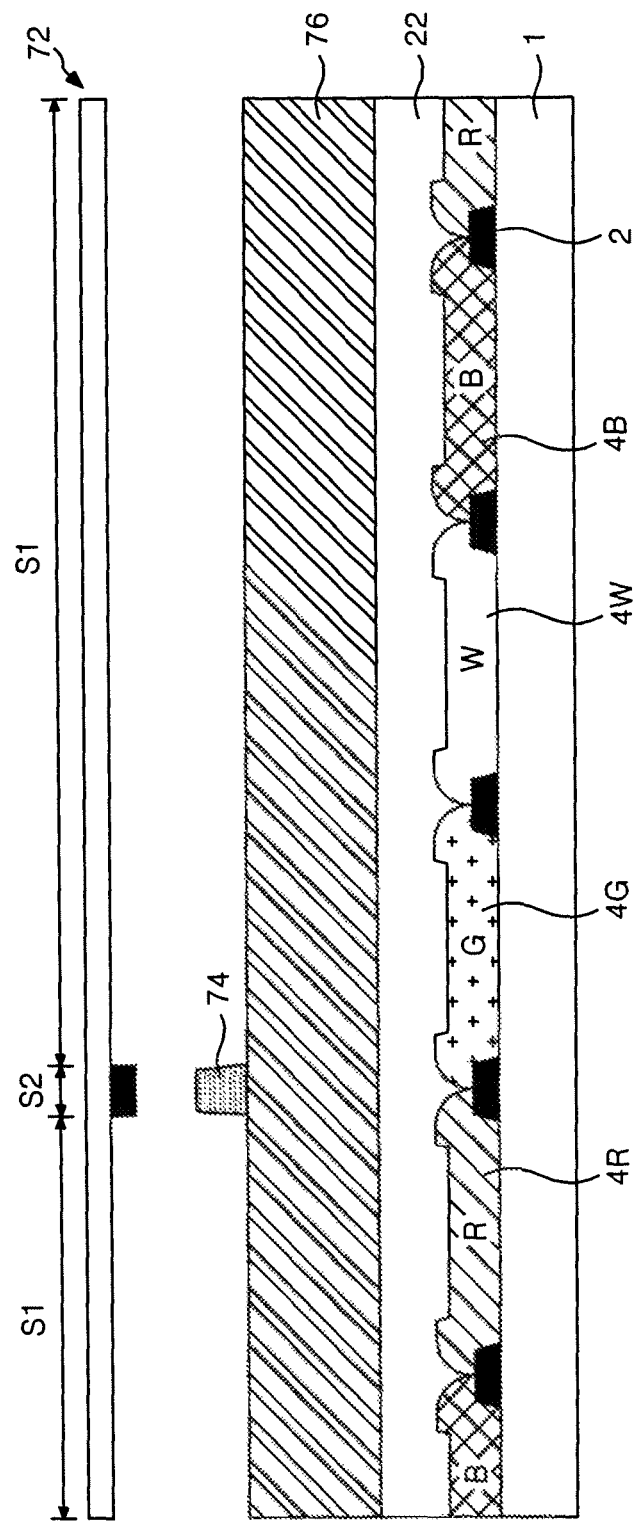
Figure 3L:
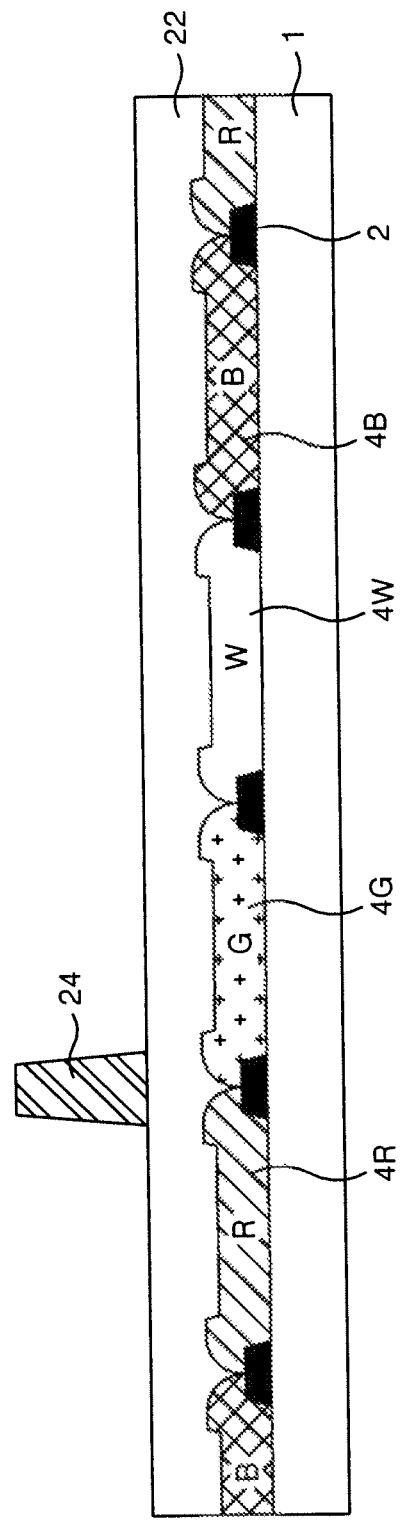
Figure 4:
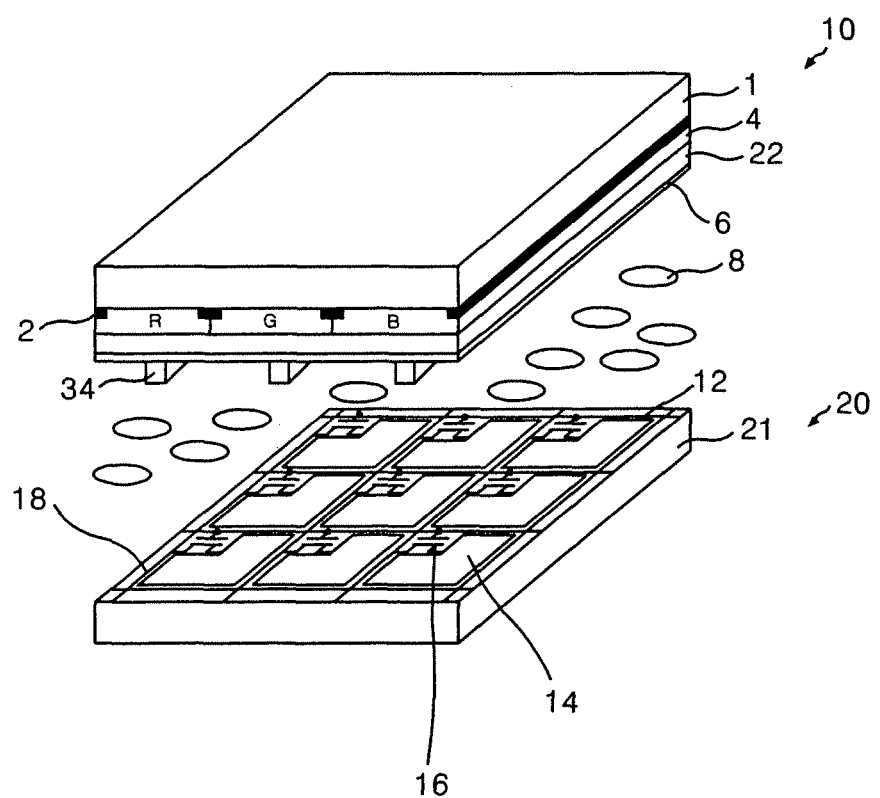
FIG. 4 is an expanded perspective view representing a related art vertical alignment type liquid crystal display panel.
Figure 5A:
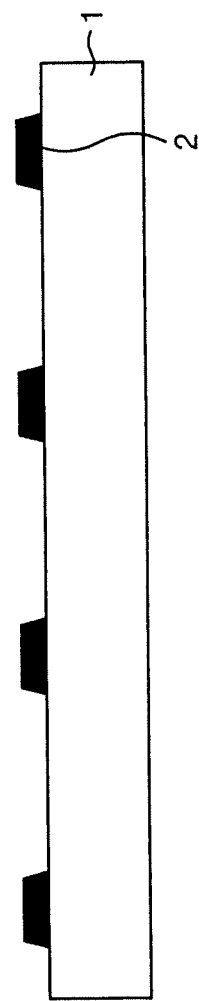
FIGS. 5A to 5E are cross-sectional views for a fabricating method of the vertical alignment type liquid crystal display panel shown in FIG. 1.
Figure 5B:
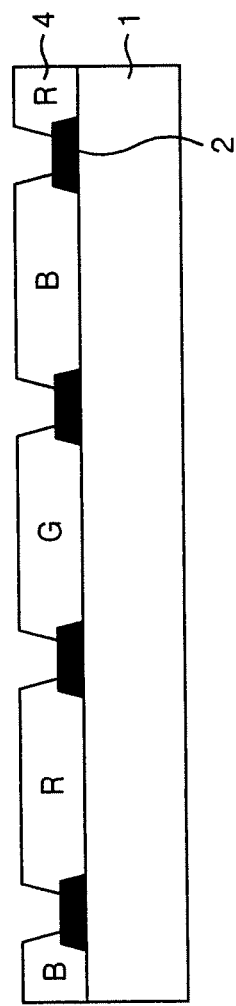
Figure 5C:
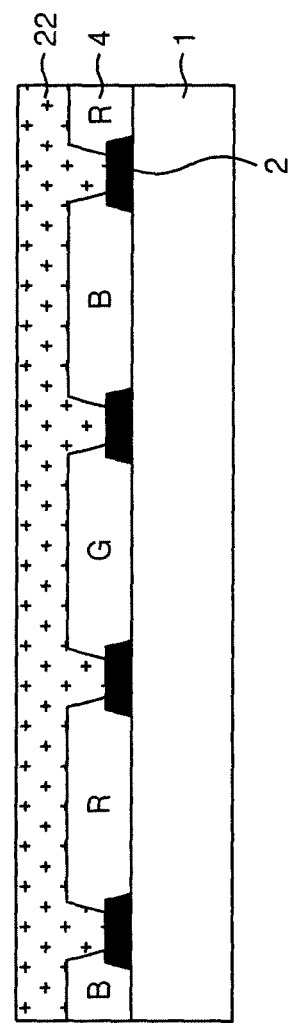
Figure 5D:
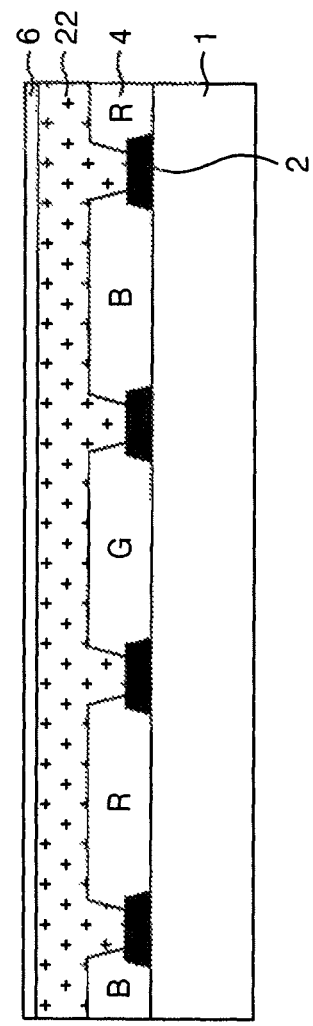
Figure 5E:
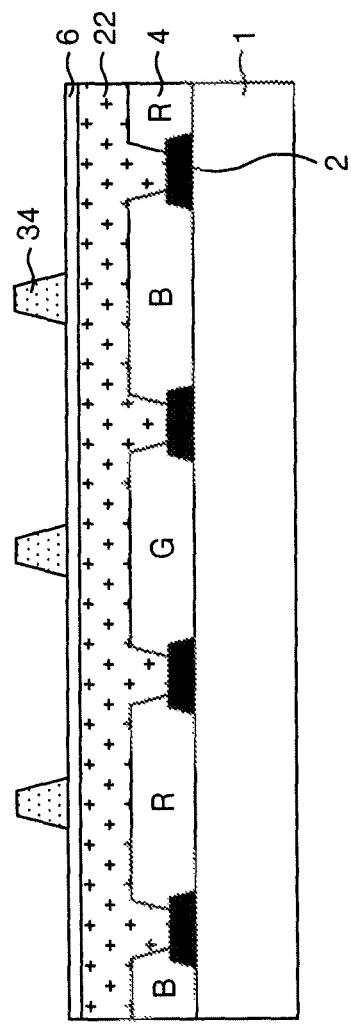
Figure 6:
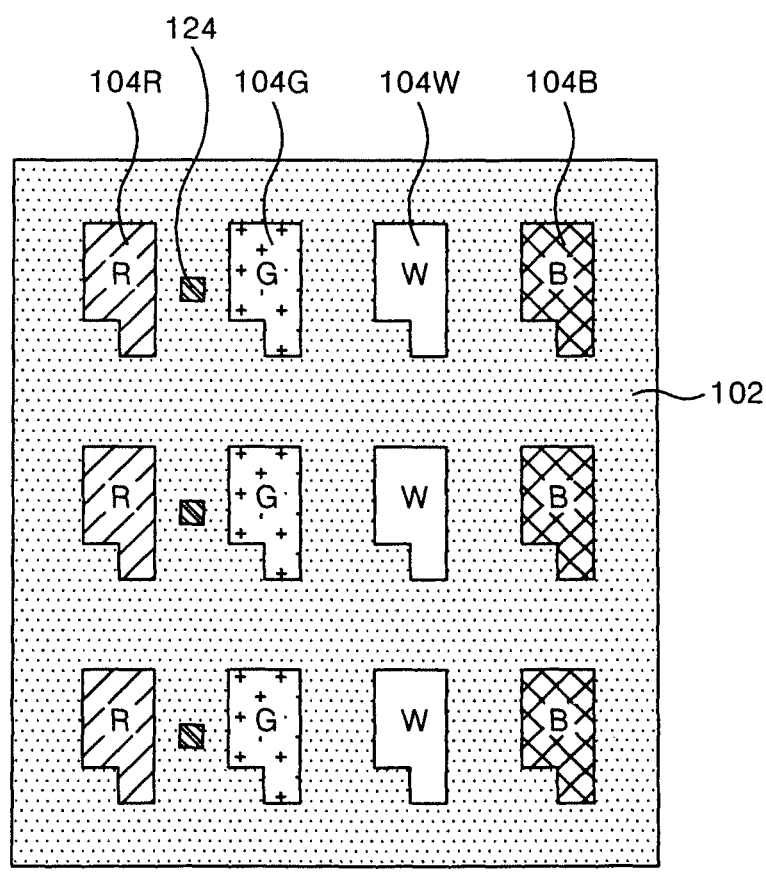
FIG. 6 is a plan view of a color filter array substrate of a liquid crystal display panel according to a first embodiment of the present invention.

FIGS. 6 and 7 are respectively a plan view and a cross-sectional view representing a color filter array substrate according to a first embodiment of the present invention. Referring to FIGS. 6 and 7, a color filter array substrate according to the first embodiment of the present invention includes a black matrix 102 formed on an upper substrate 101; red, green and blue color filters 104R, 104G and 104B; an overcoat layer 122 having a white color filter 104W; and a spacer 124 formed on the overcoat layer 122.

The black matrix 102 is formed on the upper substrate 101 in a matrix form to define a plurality of cell areas where the color filters 104 are formed, and to prevent light interference between adjacent cells. The black matrix 102 is formed to overlap areas of a thin film transistor array substrate except for a pixel electrode. For example, the black matrix 102 overlaps the gate lines, the data lines and the thin film transistors of the thin film transistor array substrate.

The color filter 104 is formed in cell areas defined by the black matrix 102. The color filter 104 includes a red color filter 104R, a green color filter 104G, a blue color filter 104B and a white color filter 104W to realize R, G, B and W colors.

The overcoat layer 122 is formed to include the white color filter 104W. In other words, the overcoat layer 122 is formed of the same material and with the same height as the white color filter 104W. A spacer 124 is formed on the black matrix 102 to maintain a cell gap between the color filter array substrate and the thin film transistor array substrate.

Figure 8A:
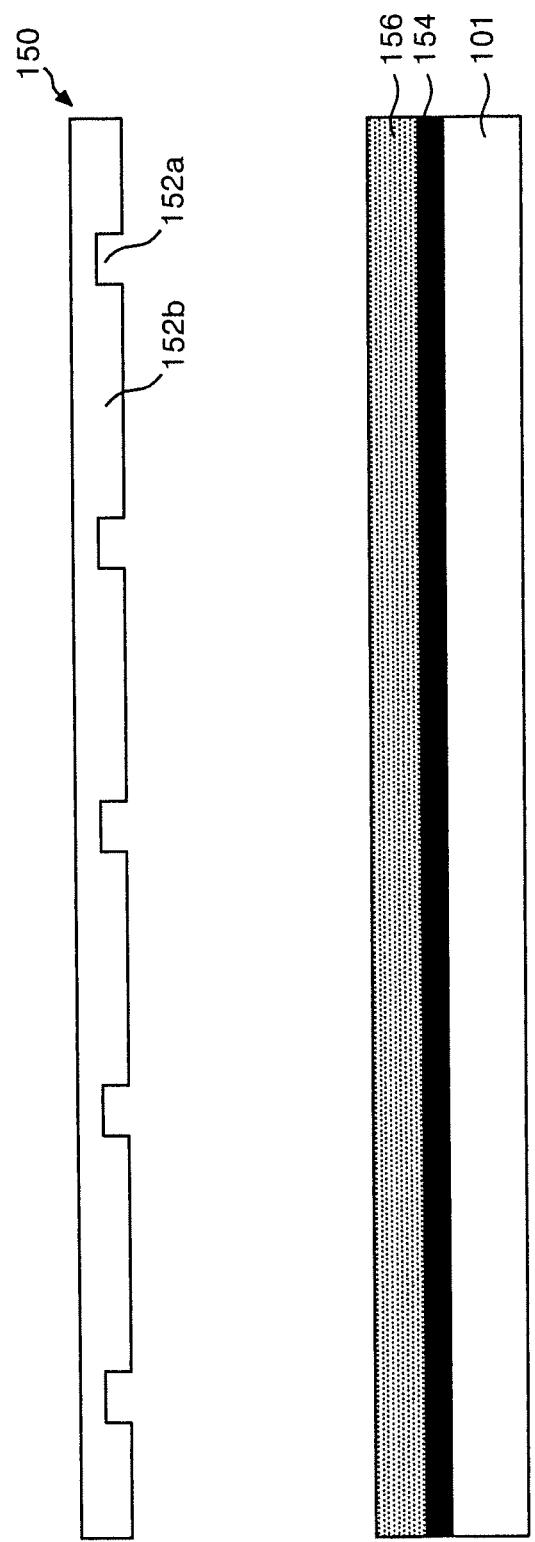
FIGS. 8A and 8M are cross-sectional views representing a fabricating method of the color filter array substrate shown in FIG. 7.

FIGS. 8A to 8M are cross-sectional views for a fabricating method of the color filter array substrate shown in FIG. 7. First, an opaque resin or an opaque metal, such as chrome (Cr), is spread over the entire surface of the upper substrate, thereby forming an opaque layer 154, as shown in FIG. 8A. A first etch resist solution 156 is formed on the opaque layer 154 by a spreading process, such as nozzle spray, spinless coating or spin coating. Herein, the etch resist solution 156 is a material that has heat resistance and chemical resistance, such as a novolac resin of about 5~30 wt % added to an ethanol solution.

Subsequently, a first soft mold 150 having a groove 152a and a projected part 152b is aligned to an upper part of the etch resist solution 156. The groove 152a of the first soft mode corresponds to an area where the black matrix is to be formed. The first soft mold 150 is formed of a rubber material with high elasticity, such as polydimethylsiloxane (PDMS), polyurethane or cross-linked novolac resin.

Figure 8B:
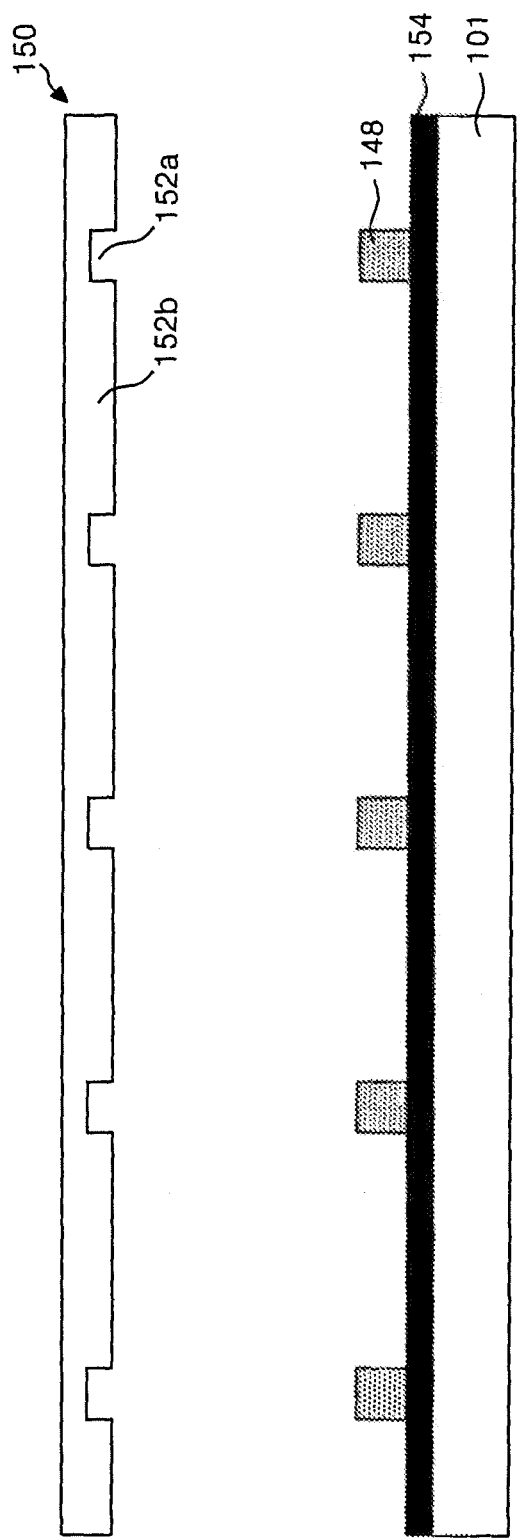

The first soft mold 150 is pressed into the etch resist solution 156 at about its own weight for a designated period, such as about 10 minutes to 2 hours, to make the surface of the projected part 152b of the soft mold 150 come into contact with the opaque layer 154. At this moment, the substrate 101 can be baked at a temperature of about 130° C., or an ultraviolet ray can be irradiated onto the etch resist solution 156 so as to soft-cure the etch resist solution 156. Thee etch resist solution 156 moves into the groove 152a of the first soft mold by a capillary effect, which is generated by a pressure between the first soft mold 150 and the substrate 101, and a repulsive force between the first soft mold and the etch resist solution 156. As a result, as shown in FIG. 8B, a first etch resist pattern 148 is formed that has a pattern shape reversely transferred from the groove 152a of the first soft mold.

Figure 8C:
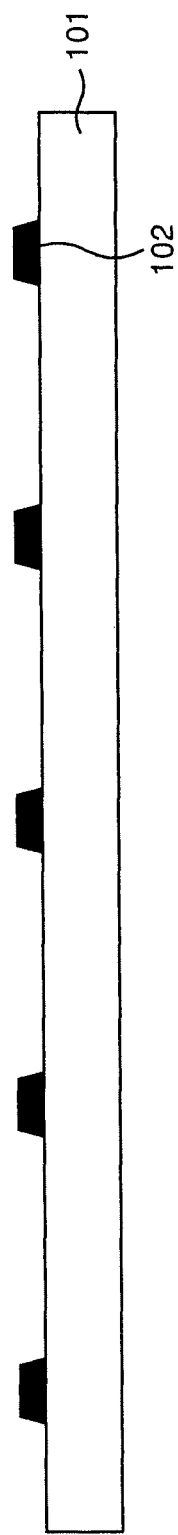

After the first soft mold 150 is separated from the substrate 101, the opaque layer 154 is patterned by an etching process using the first etch resist pattern as a mask, thereby forming the black matrix 102, as shown in FIG. 8C. Subsequently, any remaining etch resist pattern 148 on the black matrix 102 is removed by a stripping process using an eco-friendly alcoholic system, for example.

Figure 8D:
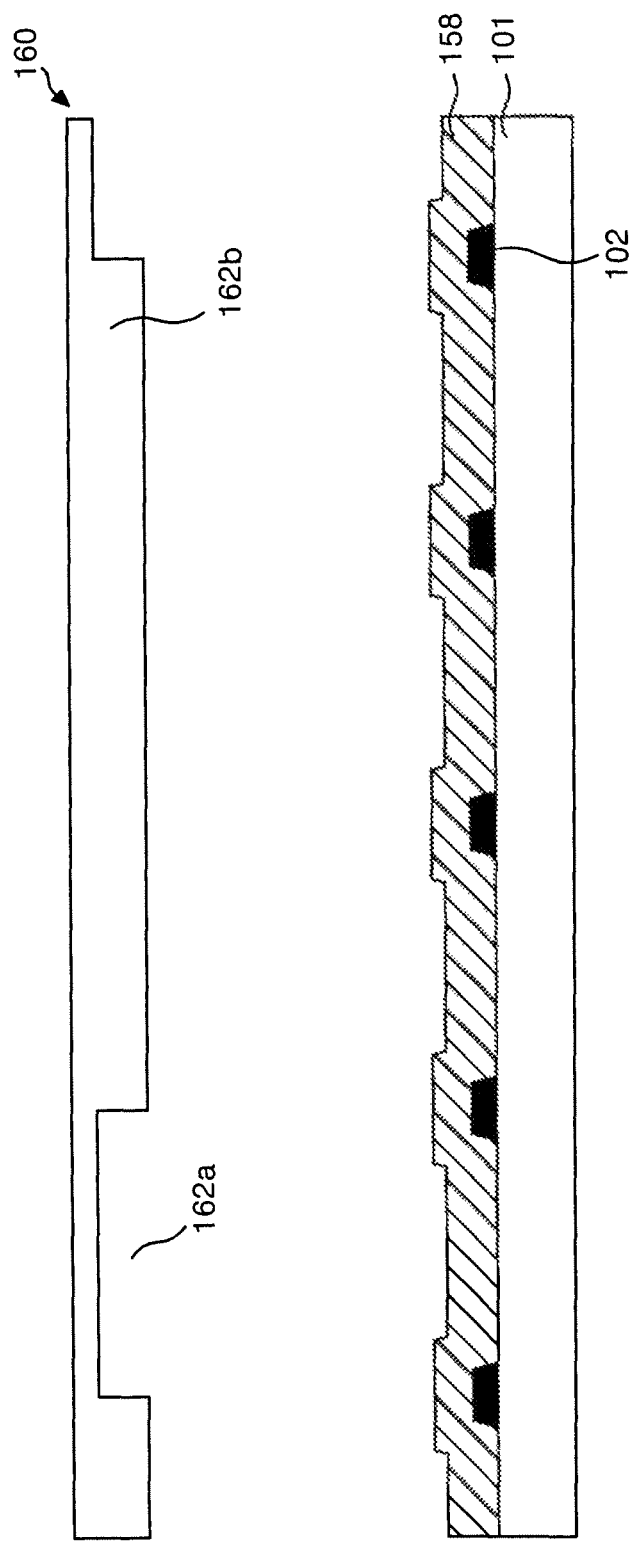

A red resin 158 is spread over the entire surface of the upper substrate 101 on which the black matrix 102 is formed, as shown in FIG. 8D. The red resin 158 includes a highly hydrophilic polymer. The highly hydrophilic polymer is a liquid pre-polymer, a liquefied polymer, or a material in which a hydrophilic radical is substituted within an acrylic system or epoxy system polymer chain that has high transmittance.

Subsequently, a second soft mold 160 with a groove 162a and a projected part 162b is aligned to the upper part of the red resin 158. The groove 162a of the second soft mold corresponds to an area where the red color filter is to be formed. The second soft mold 160 is formed of a hydrophobic rubber material with high elasticity to prevent contamination with the red resin 158. The second soft mold 160 is formed of polydimethylsiloxane (PDMS), polyurethane or cross-linked novolac resin.

Figure 8E:
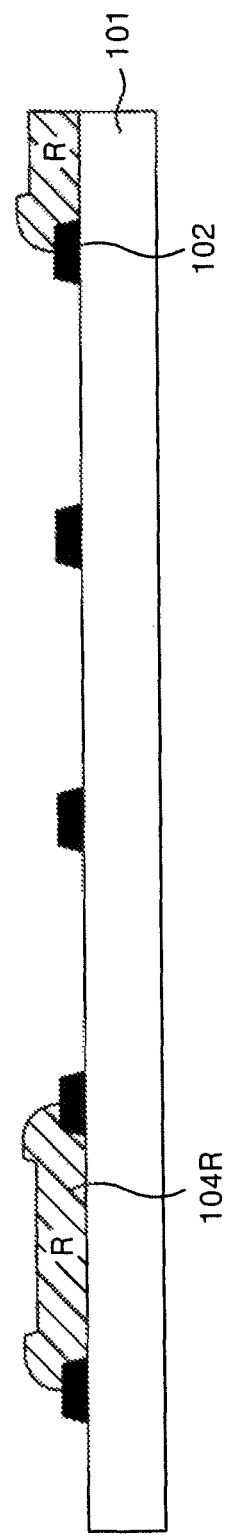

The second soft mold 160 is pressed into the red resin 158 at about its own weight for a designated period, such as about 10 minutes to 2 hours, to make the surface of the projected part 162b of the second soft mold 160 come into contact with the substrate 101 and/or the black matrix 102. At this moment, the substrate 101 can be baked at a temperature of about 130° C., or an ultraviolet UV ray can be irradiated onto the red resin 158 to soft-cure the red resin 158. The UV intensity is in accordance with at least one of a photo initiator and a base material that are included in the red resin 158. For instance, the UV intensity is about 2000~2500 m J/cm$^2$ if a base material included in the red resin 158 is epoxy, and the UV intensity is about 500~1000 mJ/cm$^2$ if a base material is acrylic. The red resin 158 moves into the groove 162a of the second soft mold by a capillary force, which is generated by a pressure between the second soft mold 160 and the substrate 101, and a repulsive force between the second soft mold 160 and the red resin 158. As a result, as shown in FIG. 8E, the red color filter 104R that has a pattern shape reversely transferred from the groove 162a of the second soft mold is formed.

Figure 8F:
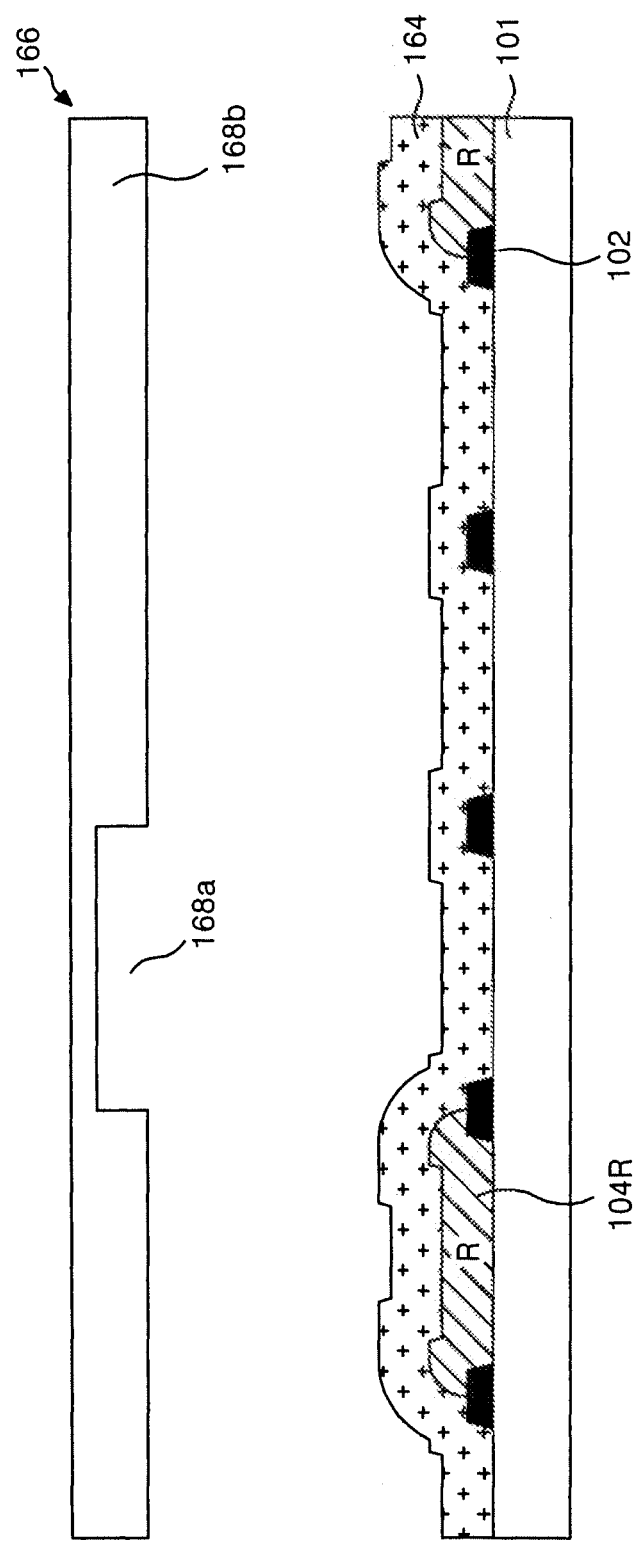
Figure 8G:
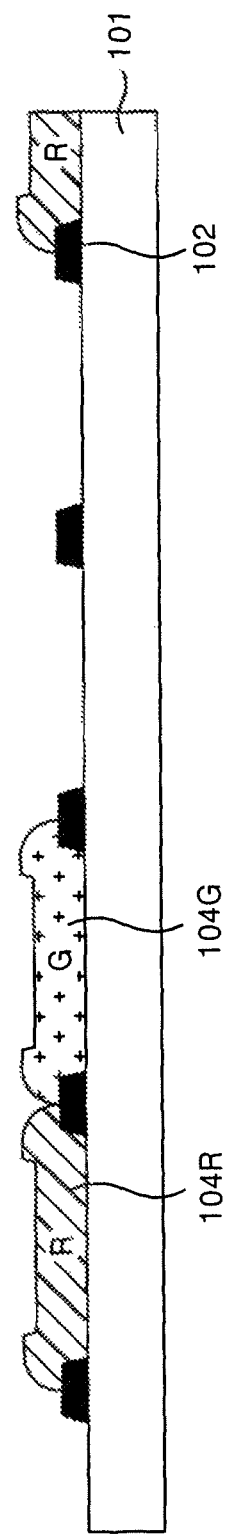

A green resin 164 is spread over the entire surface of the upper substrate 101 on which the red color filter 104 is formed, as shown in FIG. 8F. The green resin 164 includes the foregoing hydrophilic polymer. Subsequently, a third soft mold 166 with the groove 168a and the projected part 168b is aligned to the upper part of the green resin 164. The groove 168a of the third soft mold corresponds to an area where the green color filter is to be formed. The third soft mold 166 is formed of a hydrophobic rubber material with high elasticity as mentioned above. The third soft mold 166 is pressed into the green resin 164 at about its own weight for a designated period, such as about 10 minutes to 2 hours, to make the surface of the projected part 168b of the third soft mold 166 come into contact with at least one of the substrate 101, the red color filter 104R and the black matrix 102. Then, the substrate 101 can be baked at a temperature of about 130° C.

or an ultraviolet UV ray can be irradiated onto the green resin 164 to soft-cure the green resin 164. The UV intensity is in accordance with at least one of a photo initiator and a base material that are included in the green resin 164. For instance, the UV intensity is about 2000~2500 m J/cm$^2$ if a base material included in the green resin 164 is epoxy, and the UV intensity is about 500~1000 mJ/cm$^2$ if a base material is acrylic. The green resin 164 moves into the groove 168a of the third soft mold. As a result, as shown in FIG. 8G, the green color filter 104G that has a pattern shape reversely transferred from the groove 168a of the third soft mold is formed.

Figure 8H:
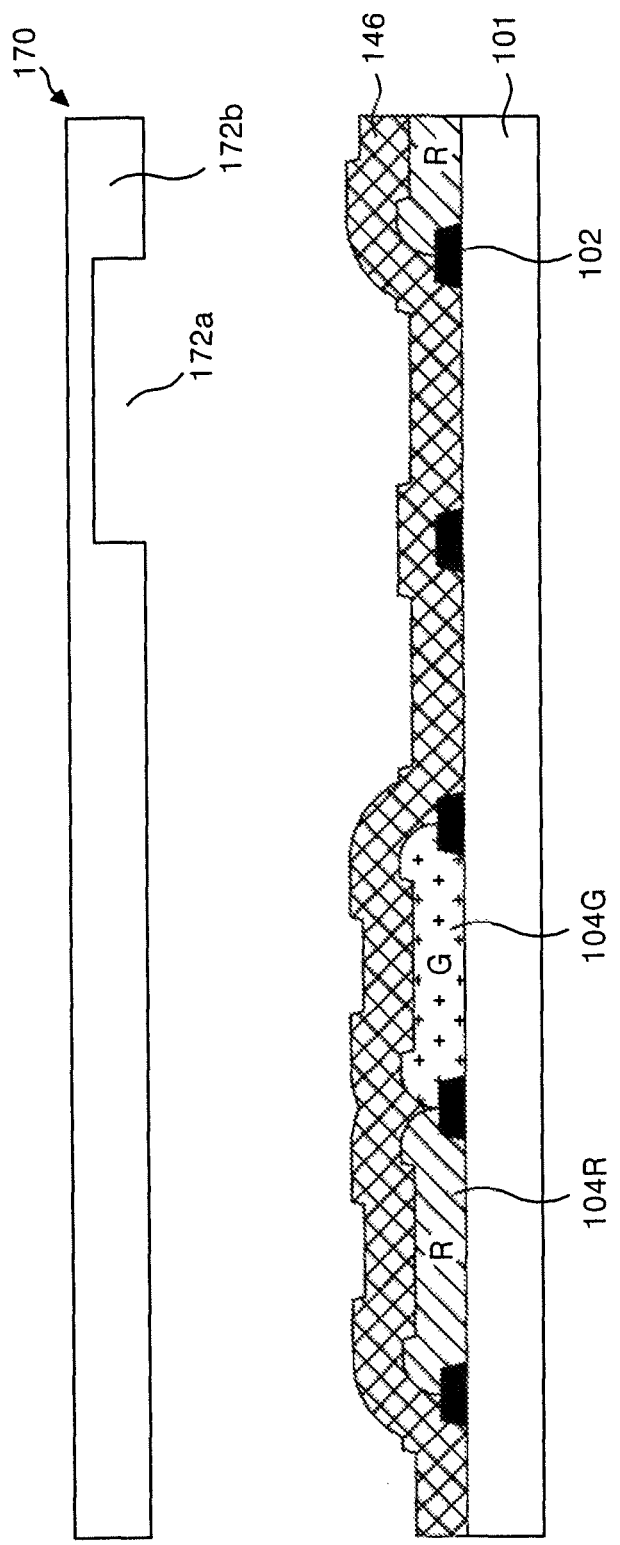
Figure 8I:
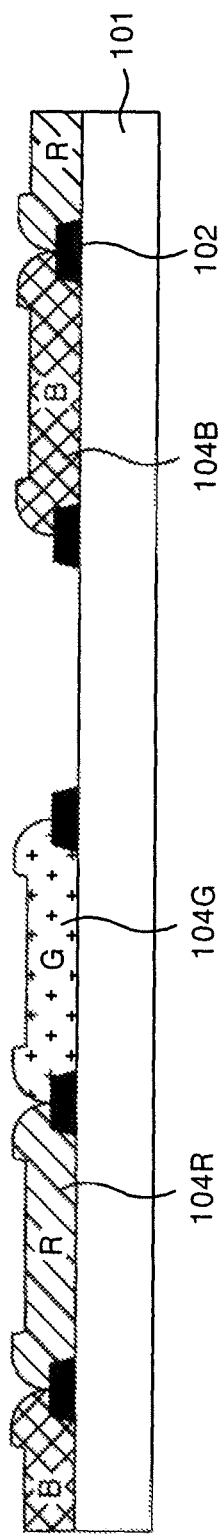

A blue resin 146 is spread over the entire surface of the upper substrate 101 on which the green color filter 104G is formed, as shown in FIG. 8H. The blue resin 146 includes the foregoing hydrophilic polymer. Subsequently, a fourth soft mold 170 with the groove 172a and the projected part 172b is aligned to the upper part of the blue resin 146. The groove 172a of the fourth soft mold corresponds to an area where the green color filter is to be formed. The fourth soft mold 170 is formed of a hydrophobic rubber material with high elasticity as mentioned above. The fourth soft mold 170 is pressed into the blue resin 146 at about its own weight for a designated period, such as about 10 minutes to 2 hours, to make the surface of the projected part 172B of the fourth soft mold 170 come into contact with at least one of the substrate 101, the red color filter 104R and the black matrix 102. The substrate 101 can be baked at a temperature of about below 130° C. or an ultraviolet UV ray can be irradiated onto the blue resin 146 to soft-cure the blue resin 146. The UV intensity is in accordance with at least one of a photo initiator and a base material that are included in the blue resin 146. For instance, the UV intensity is about 2000~2500 m J/cm$^2$ if a base material included in the blue resin 146 is epoxy, and the UV intensity is about 500~1000 mJ/cm$^2$ if a base material is acrylic. The blue resin 146 moves into the groove 172a of the fourth soft mold. As a result, as shown in FIG. 8I, the blue color filter 104B which has a pattern shape reversely transferred from the groove 172a of the fourth soft mold 170 is formed.

Figure 8J:
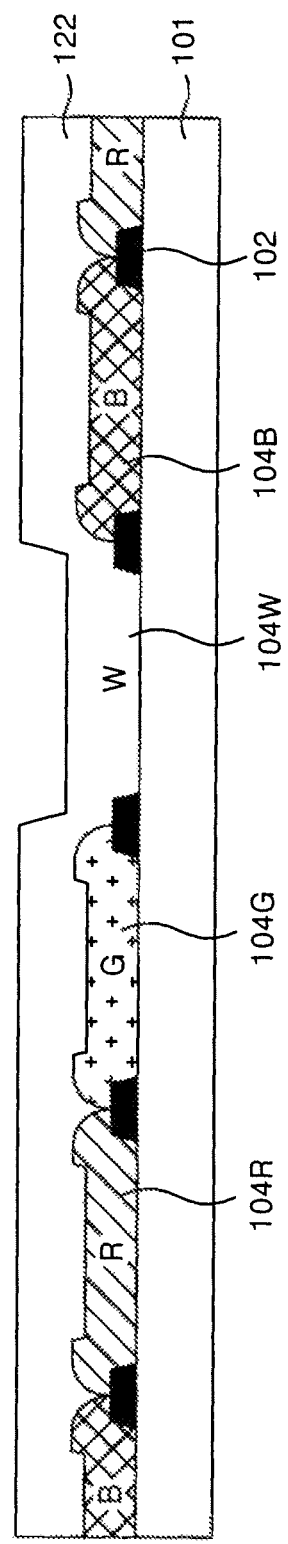

An organic insulating material is printed over the entire surface of the substrate on which the blue color filter 104B is formed, thereby forming both a white color filter 104W and an overcoat layer 122, as shown in FIG. 8J. An organic insulating material 174 is spread over the entire surface of the upper substrate 101 on which the white color filter 104 W and the overcoat layer 122 are formed, as shown in FIG. 8K. A second etch resist solution 142 is formed on the organic insulating material 174 by a deposition method, such as nozzle spray, spinless coating or spin coating.

Subsequently, a fifth soft mold 176 with the groove 178a and the projected part 178b is aligned to the upper part of the second etch resist solution 142. The groove 178a of the fifth soft mold corresponds to an area where a spacer is to be formed. The fifth soft mold 176 is pressed into the second etch resist 142 at about its own weight to make the surface of the projected part 178b of the fifth soft mold 176 in contact with the overcoat layer 122. The substrate 101 can be baked at a temperature of about 130° C. or an ultraviolet UV ray can be irradiated onto the second etch resist solution 142 to soft-cure the second etch resist solution 142. The second etch resist solution 142 moves into the groove 178a of the fifth soft mold. As a result, as shown in FIG. 8L, the second etch resist pattern 144 that has a pattern shape reversely transferred from the groove 178a of the fifth soft mold 176 is formed.

After the fifth soft mold 176 is separated from the substrate 101, the organic insulating material 174 is patterned by an etching process using the second etch resist pattern 144 as a mask, thereby forming the spacer 124, as shown in FIG. 8M.

Subsequently, any remaining second etch resist pattern 144 on the spacer 124 is removed by a stripping process using an eco-friendly alcoholic system, for example.

In this way, the fabricating method of the color filter array substrate according to the first embodiment of the present invention can pattern the thin films of the color filter array substrate using the soft mold and the etch resist without using any photolithography process. Accordingly, no expensive exposure equipment is required and the process is simplified. The precision is high and process time is short, thereby improving the manufacturing yield.

In the color filter array substrate according to the first embodiment of the present invention, as shown in FIG. 7, a stepped difference (d) with a designated width is formed between the white color filter 104W and the overcoat layer 122. This stepped difference makes the cell gap of an area corresponding to the white color filter 104 different from a cell gap of an area corresponding to the overcoat layer 122. Accordingly, the electric field between the pixel electrode and the common electrode applied to the liquid crystal can be different, so as to make the rotation angle of the liquid crystal different at different locations, which generates a picture quality deterioration, such as a stain.

Figure 9:
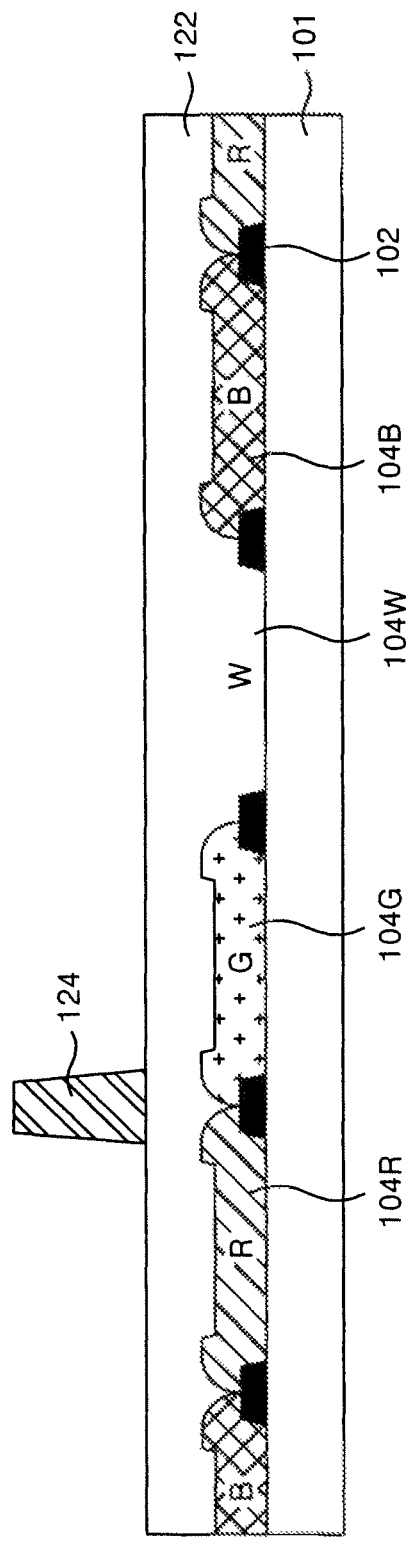
FIG. 9 is a cross-sectional view for a color filter array substrate according to a second embodiment of the present invention.

FIG. 9 is a cross-sectional view of a color filter array substrate according to a second embodiment of the present invention. Referring to FIG. 9, the color filter array substrate according to the second embodiment of the present invention includes similar components as the color filter array substrate shown in FIG. 7 except that the overcoat layer is formed on the entire surface of the upper substrate to smooth out the surface. Accordingly, a detailed description of the similar components will be omitted.

The overcoat layer 122 is formed to smooth out the substrate where the red, green and blue color filters 104R, 104G and 104B are formed. The overcoat 122 is formed to include the white color filter 104W. The overcoat layer 122 including the white color filter 104W can be a highly hydrophilic polymer. The highly hydrophilic polymer is a liquid pre-polymer, a liquefied polymer, or a material in which a hydrophilic radical is substituted by an acrylic system or epoxy system polymer chain that has high transmittance. Herein, the liquid pre-polymer includes an organic material, a binder and a photo initiator. The organic material is a material that has a repulsive force when in contact with the soft mold, a coloring degree that is not greater than 20 and good transparency, such as poly ethylene glycol (PEG). The binder can be a styrene acrylic monomer in which styrene co-monomer with high adherence is added to the acrylic monomer.

The color filter array substrate according to the second embodiment of the present invention has both a white color filter 104W and an overcoat layer 122 with a smooth surface. The cell gap is the same over the entire liquid crystal display panel. Thus, picture quality deterioration due to an uneven overcoat layer can be prevented.

Figure 10A:
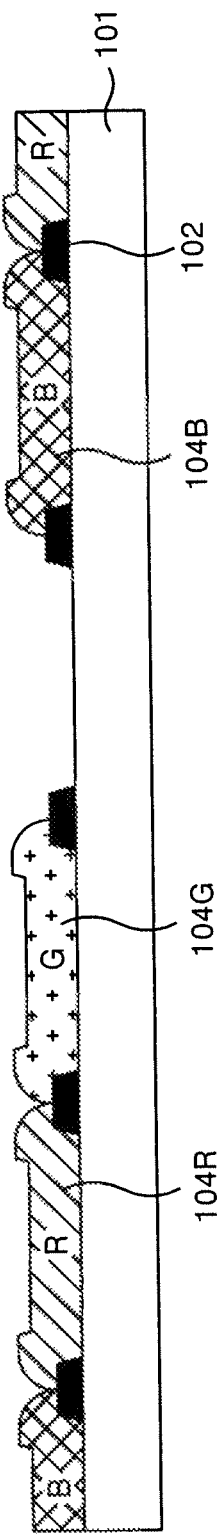
FIGS. 10A to 10D are cross-sectional views for a fabricating method of the color filter array substrate shown in FIG. 9.
Figure 10B:
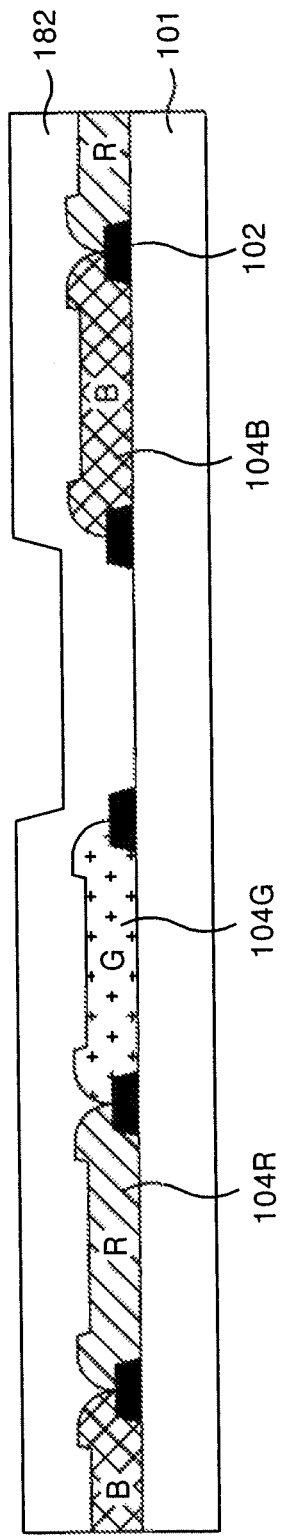
Figure 10C:
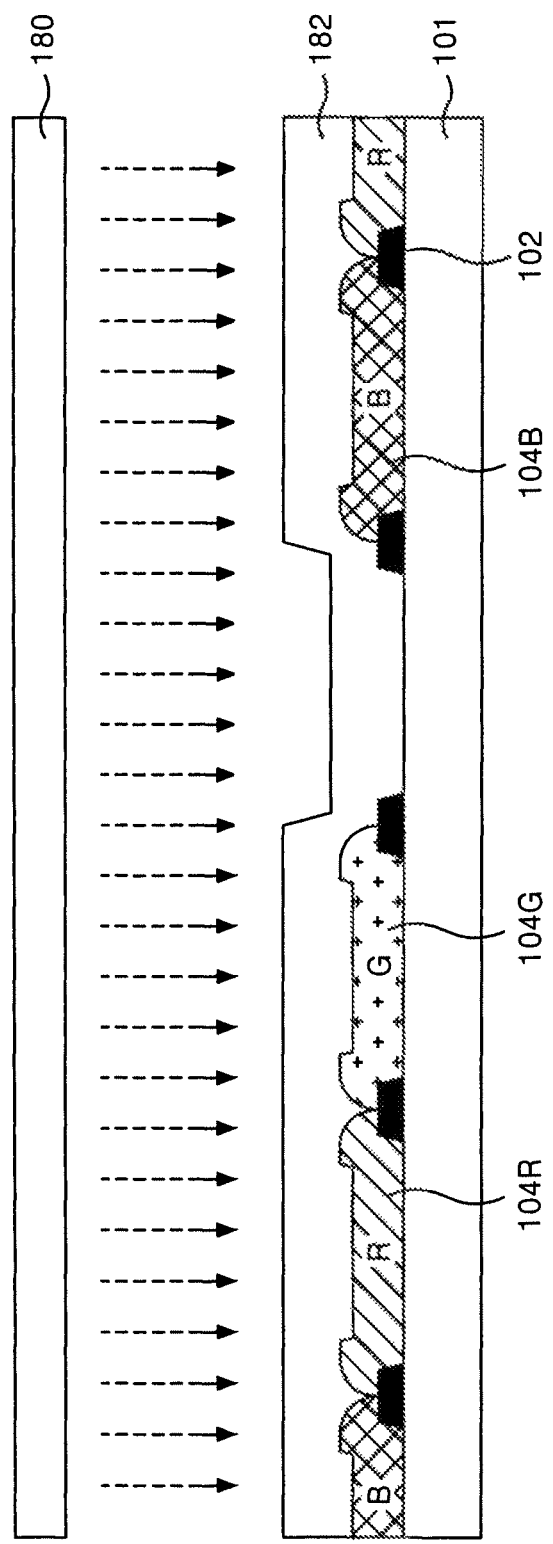
Figure 10D:
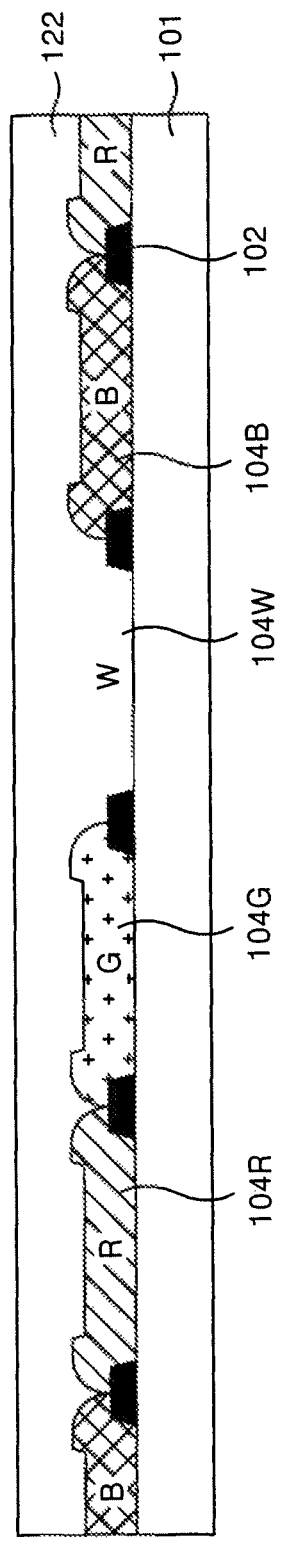

FIGS. 10A to 10D are cross-sectional views for a fabricating method of the overcoat layer including the white color filter shown in FIG. 9. As shown in FIG. 10A, the black matrix 102, the red, green, blue color filters 104R, 104G and 104B are sequentially formed on the upper substrate 101. The highly hydrophilic polymer 182 is printed over the entire surface of the upper substrate 101, as shown in FIG. 10B. A flat panel soft mold 180 is aligned to the upper substrate 101 where the highly hydrophilic polymer 182 is formed, as shown in FIG. 10C. The flat panel soft mold 180 is pressed into the highly hydrophilic polymer 182 at about its own weight. The substrate 101 can be baked at a temperature of about 130° C. or an ultraviolet UV ray can be irradiated onto the highly hydrophilic polymer 182 to soft-cure the highly hydrophilic polymer 182. The UV intensity is in accordance with at least one of a photo initiator and a base material that are included in the highly hydrophilic polymer 182. For instance, the UV intensity is about 2000~2500 m J/cm$^2$ if a base material included in the highly hydrophilic polymer 182 is epoxy, and the UV intensity is about 500~1000 mJ/cm$^2$ if a base material is acrylic. Then, as shown in FIG. 10D, the stepped difference part of the highly hydrophilic polymer 182 becomes flat to form the overcoat layer 122 having a flat upper surface. And then, after the flat panel soft mold 180 is separated from the substrate 101, the substrate 101 is cured at about 200° C.

The fabricating method of the color filter array substrate according to the second embodiment of the present invention patterns the thin film of the color filter array substrate by use of the soft mold and the etch resist without using any photolithography process, and forms the overcoat layer and the white color filter at the same time. Accordingly, no expensive exposure equipment is required, and the process is simplified. The precision is high and the process time is short, thereby improving the manufacturing yield. Further, the fabricating method of the color filter array substrate according to the second embodiment of the present invention forms the overcoat layer to be flat by use of the flat panel soft mold, thereby preventing picture quality deterioration, such as stain.

Figure 11:
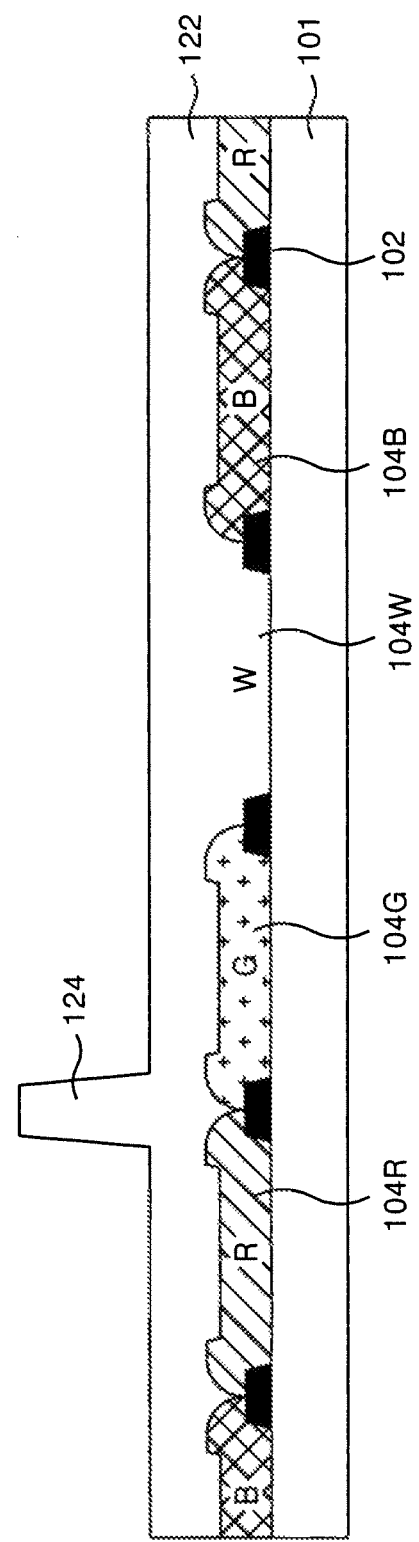
FIG. 11 is a cross-sectional view of a color filter array substrate according to a third embodiment of the present invention.

FIG. 11 is a cross-sectional view representing a color filter array substrate according to a third embodiment of the present invention. Referring to FIG. 11, the color filter array substrate according to the third embodiment of the present invention includes similar components as the color filter array substrate shown in FIG. 9 except that the overcoat layer and the spacer are integral and formed together. Accordingly, a detailed description of similar components will be omitted.

The overcoat layer 122 is formed to smooth the substrate where the red, green and blue color filters 104R, 104G, and 104B are formed. The overcoat 122 is formed to include the white color filter 104W and the spacer 124. The overcoat layer 122 including the white color filter 104W can be a hydrophilic polymer to prevent contamination from being generated when in contact with a highly hydrophobic soft mold. The highly hydrophilic polymer is a liquid pre-polymer, a liquefied polymer, or a material in which a hydrophilic radical is substituted by an acrylic system or epoxy system polymer chain that has high transmittance. The liquid pre-polymer includes an organic material, a binder and a photo initiator. The organic material is a material that has a repulsive force when in contact with the soft mold, a coloring degree not greater than 20 and a good transparency, such as poly ethylene glycol PEG and so on. The binder is a styrene acrylic monomer having a styrene co-monomer with high adherence added to a acrylic monomer.

The spacer 124 acts to maintain the cell gap between the color filter array substrate and the thin film transistor array substrate. The spacer 124 is formed of the same material as the overcoat layer 122 on the black matrix 102. The color filter array substrate according to the third embodiment of the present invention includes the white color filter 104W and the overcoat layer 122 with a smooth surface. The cell gap is the same over the entire liquid crystal display panel. Thus, picture quality deterioration due to an uneven overcoat layer can be prevented.

Figure 12A:
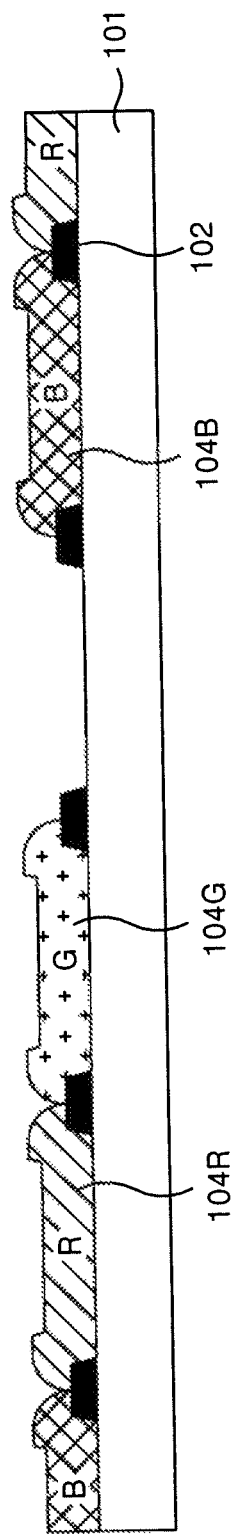
FIGS. 12A, to 12D are cross-sectional views for a fabricating method of the color filter array substrate shown in FIG. 11.

FIGS. 12A to 12D are cross-sectional views for a fabricating method of the overcoat layer including the white color filter and spacer shown in FIG. 11. As shown in FIG. 12A, the black matrix 102, the red, green, blue color filters 104R, 104G and 104B are sequentially formed on the upper substrate 101.

Figure 12B:
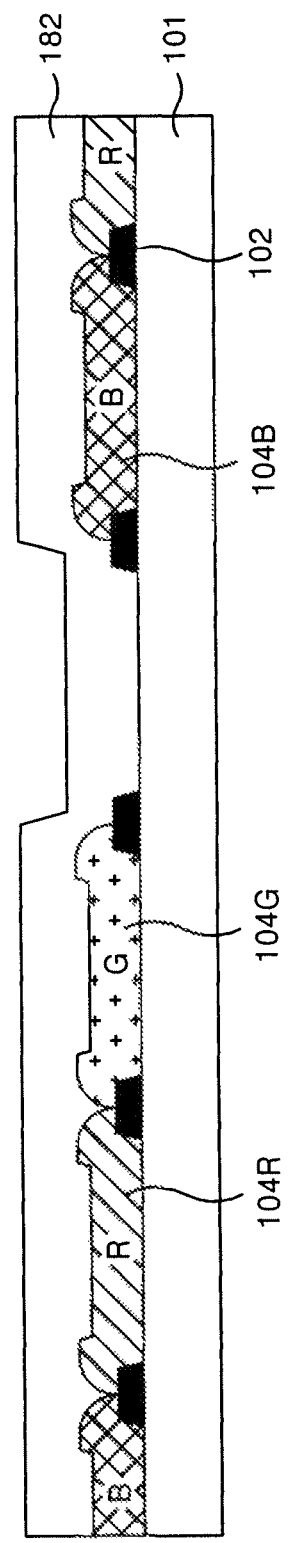
Figure 12C:
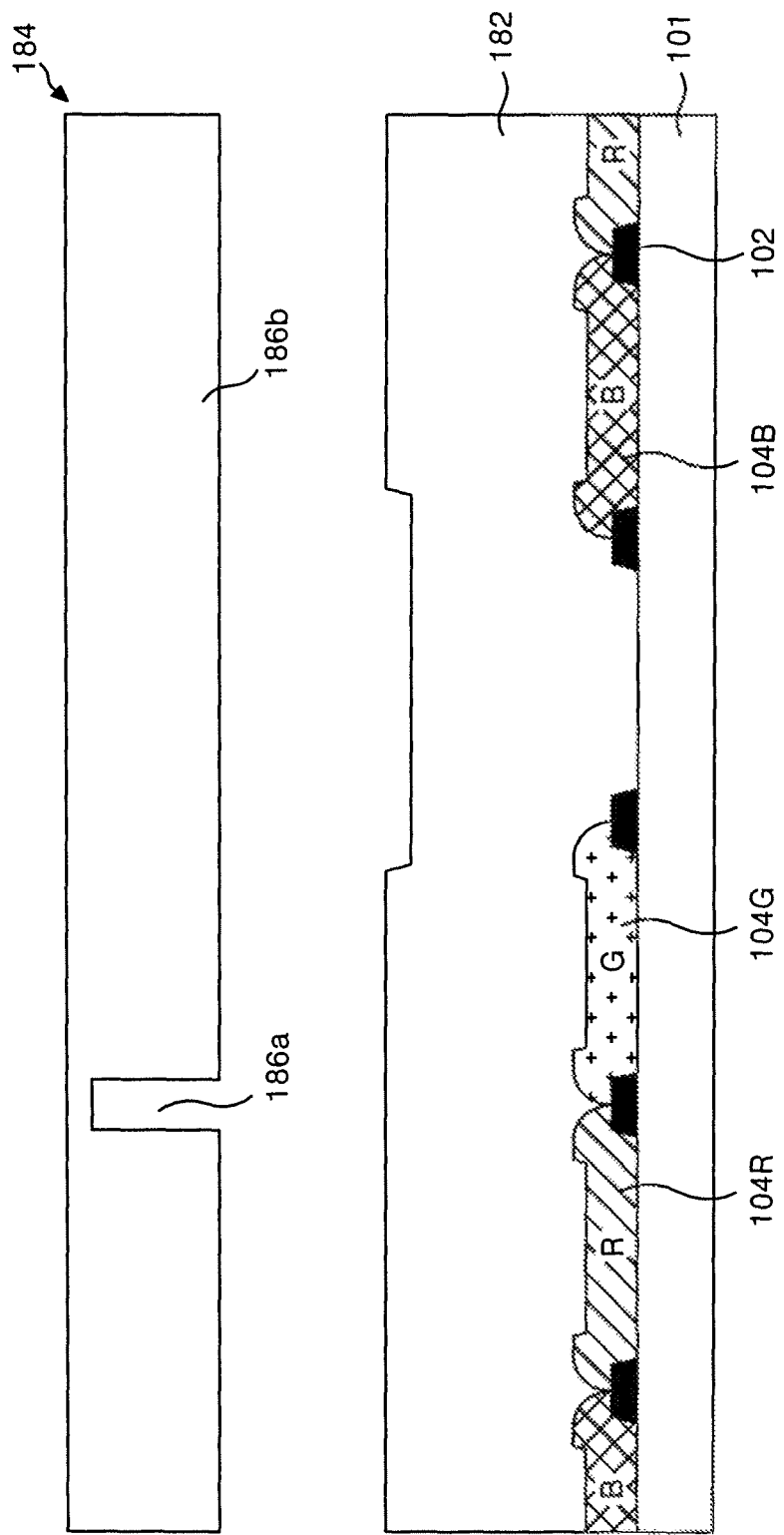

The highly hydrophilic polymer 182 is printed over the entire surface of the upper substrate 101, as shown in FIG. 12B. A soft mold 184 having a groove 186a and a projected part 186b is aligned to the upper substrate 101 on which the highly hydrophilic polymer 182 is formed, as shown in FIG. 12C. The groove 186a of the soft mold corresponds to an area where a spacer is to be formed. The soft mold 184 is pressed into the highly hydrophilic polymer 182 at about its own weight. The substrate 101 can be baked at a temperature of about 130° C. or ultraviolet UV ray is irradiated onto the highly hydrophilic polymer 182 to soft-cure the highly hydrophilic polymer 182. The UV intensity is in accordance with at least one of a photo initiator and a base material that are included in the highly hydrophilic polymer 182. For instance, the UV intensity is about 2000~2500 m J/cm$^2$ if a base material included in the highly hydrophilic polymer 182 is epoxy, and the UV intensity is about 500~1000 mJ/cm$^2$ if a base material is acrylic. Then, the highly hydrophilic polymer 182 moves into the groove 186a of the soft mold. As a result, as shown in FIG. 12D, the spacers 124 with a pattern shape reversely transferred from the groove 186a of the soft mold and the overcoat layer 122 including the white color filter 104W are formed. After the soft mold 184 is separated from the substrate 101, the substrate 101 is cured at about 200° C.

The fabricating method of the color filter array substrate according to the third embodiment of the present invention patterns the thin film of the color filter array substrate by use of the soft mold and the etch resist without using any photolithography process, and forms the overcoat layer, the white color filter and the spacer at the same time. Accordingly, no expensive exposure equipment is required and the process can be simplified. The precision is high and the process time is short, thereby improving the manufacturing yield.

Figure 13:
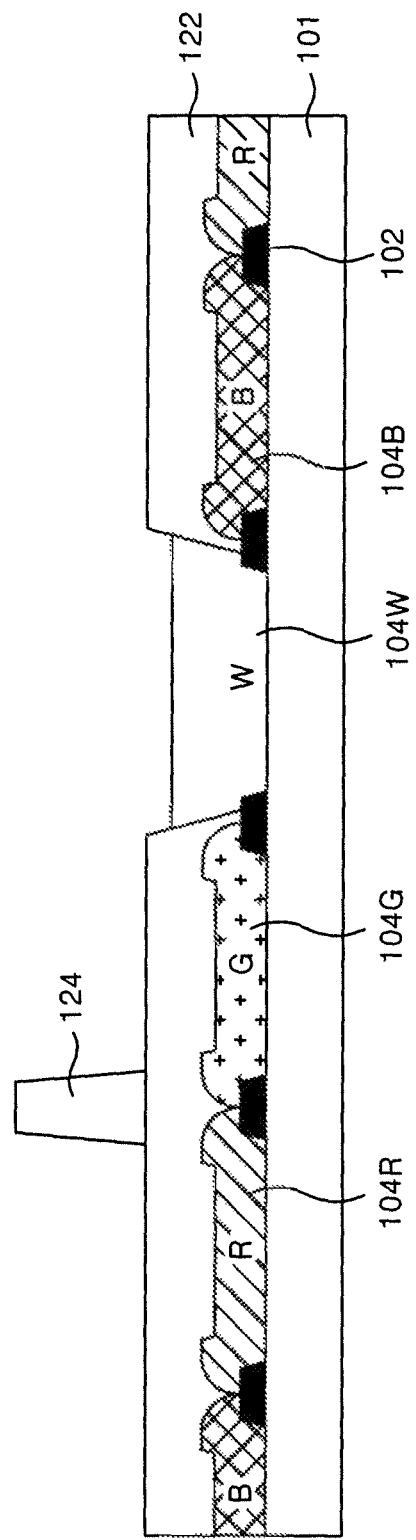
FIG. 13 is a cross-sectional view for a color filter array substrate according to a fourth embodiment of the present invention.

FIG. 13 is a cross-sectional view for a color filter array substrate according to a fourth embodiment of the present invention. Referring to FIG. 13, the color filter array substrate according to the fourth embodiment of the present invention includes similar components as the color filter array substrate shown in FIG. 11 except for the overcoat layer having an opening to expose a white pixel area, and the spacer formed of the same material as the overcoat layer. The overcoat layer 122 is formed over the color filter except for an area where the white color comes through from the backlight. The overcoat layer 122 acts to compensate for the stepped difference between the red, greed and blue color filters.

The spacer 124 acts to maintain the cell gap between the color filter array substrate and the thin film transistor array substrate. The spacer 124 is simultaneously formed of the same material as the overcoat layer 122. At least one of the overcoat 122 and the spacer 124 is formed of highly hydrophilic polymer to prevent contamination from being generated when in contact with a highly hydrophobic soft mold. The highly hydrophilic polymer is a liquid pre-polymer, a liquefied polymer, or a material in which a hydrophilic radical is substituted by an acrylic system or epoxy system polymer chain that has high transmittance. Herein, the liquid pre-polymer includes an organic material, a binder and a photo initiator. The organic material is a material that has a repulsive force when in contact with the soft mold, a coloring degree not greater than 20 and good transparency, such as poly ethylene glycol (PEG). The binder is a styrene acrylic monomer in which a styrene co-monomer with high adherence is added to an acrylic monomer.

Figure 14B:
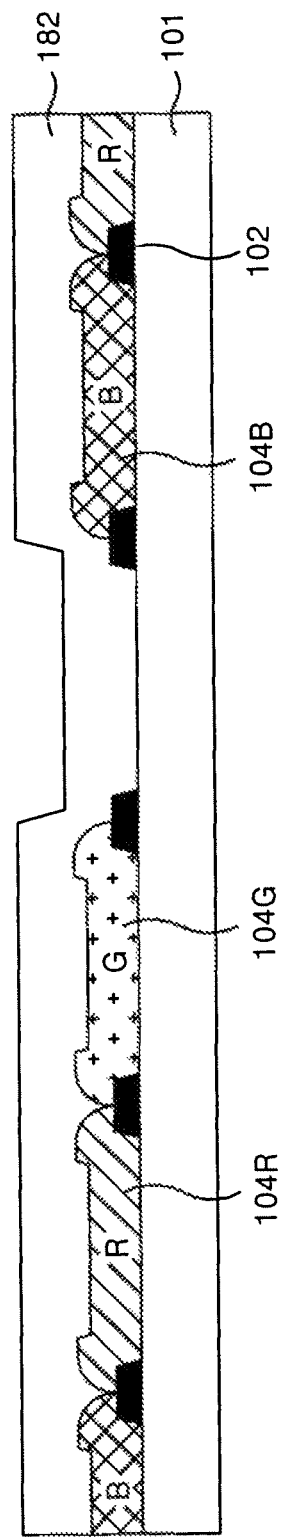
Figure 14C:
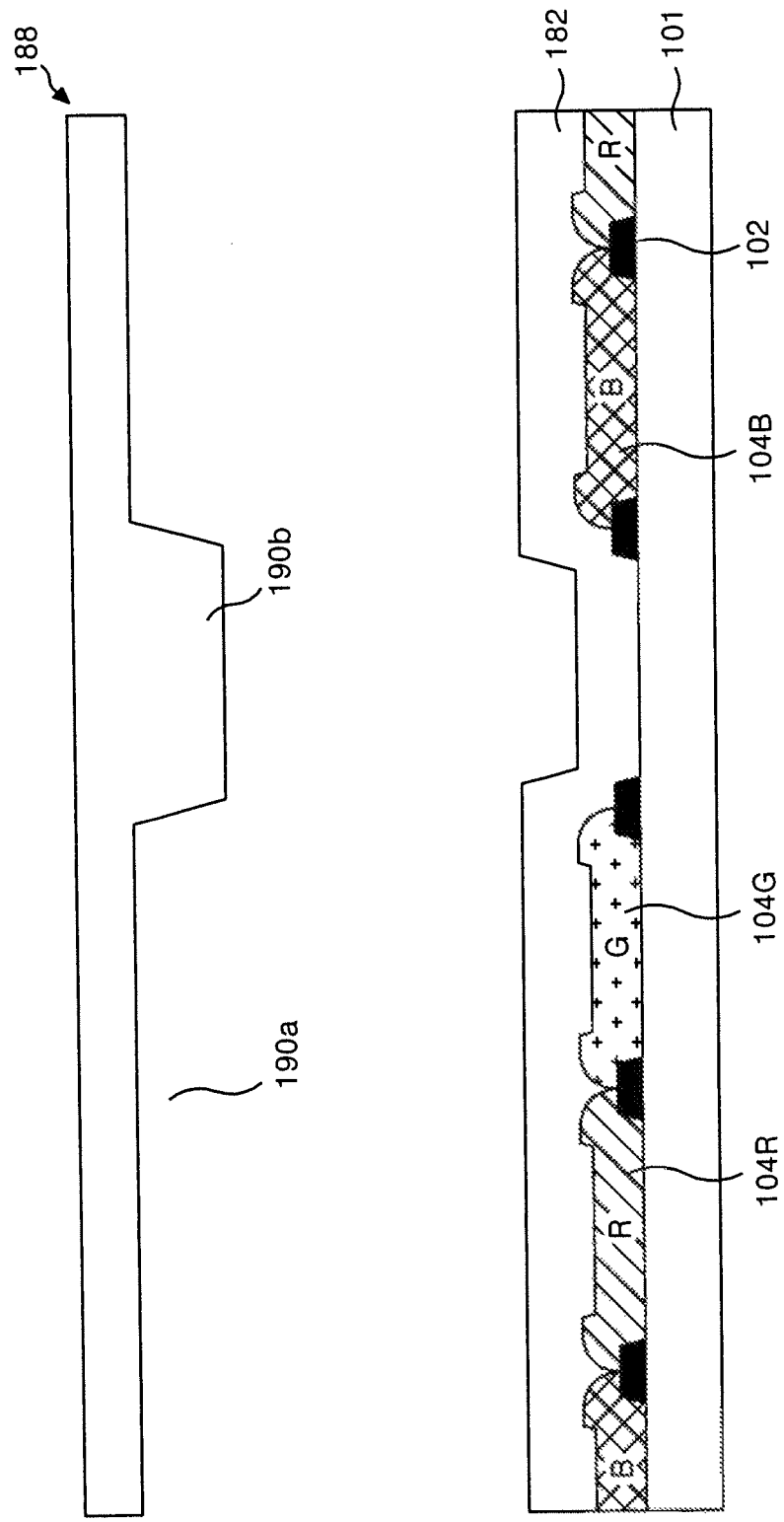
Figure 14D:
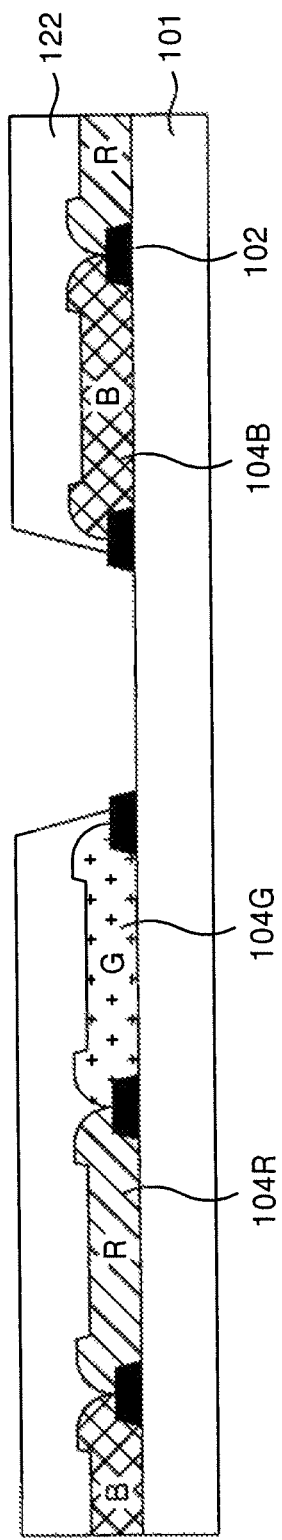

FIGS. 14A to 14F are cross-sectional views for a fabricating method of the color filter array substrate shown in FIG. 13. As shown in FIG. 14A, the black matrix 102, the red, green, blue color filters 104R, 104G and 104B are sequentially formed on the upper substrate 101. A highly hydrophilic first polymer 198 is printed over the whole surface of the upper substrate 101, as shown in FIG. 14B. A soft mold 188 having a groove 190a and a projected part 190b is aligned to the upper substrate 101 where the highly hydrophilic first polymer 198 is formed, as shown in FIG. 14C. The projected part 190b of the soft mold 188 corresponds to an area where an opening in the overcoat layer is to be formed. The soft mold 188 is pressed into the highly hydrophilic first polymer 198 at about its own weight. The substrate 101 is baked at a temperature of about 130° C. or an ultraviolet UV ray is irradiated onto the highly hydrophilic first polymer 198 to soft-cure the highly hydrophilic first polymer 198. The UV intensity is in accordance with at least one of a photo initiator and a base material that are included in the highly hydrophilic first polymer 198. For instance, the UV intensity is about 2000~2500 m J/cm$^2$ if a base material included in the highly hydrophilic first polymer 198 is epoxy, and the UV intensity is about 500~1000 mJ/cm$^2$ if a base material is acrylic. Then, the highly hydrophilic first polymer 198 is separated from the projected part 190b of the soft mold. As a result, as shown in FIG. 14D, the overcoat layer 122 with an opening reversely transferred from the a projected part 190b of the soft mold is formed. And then, after the soft mold 188 is separated from the substrate 101, the substrate 101 is cured at about 200° C.

Figure 14E:
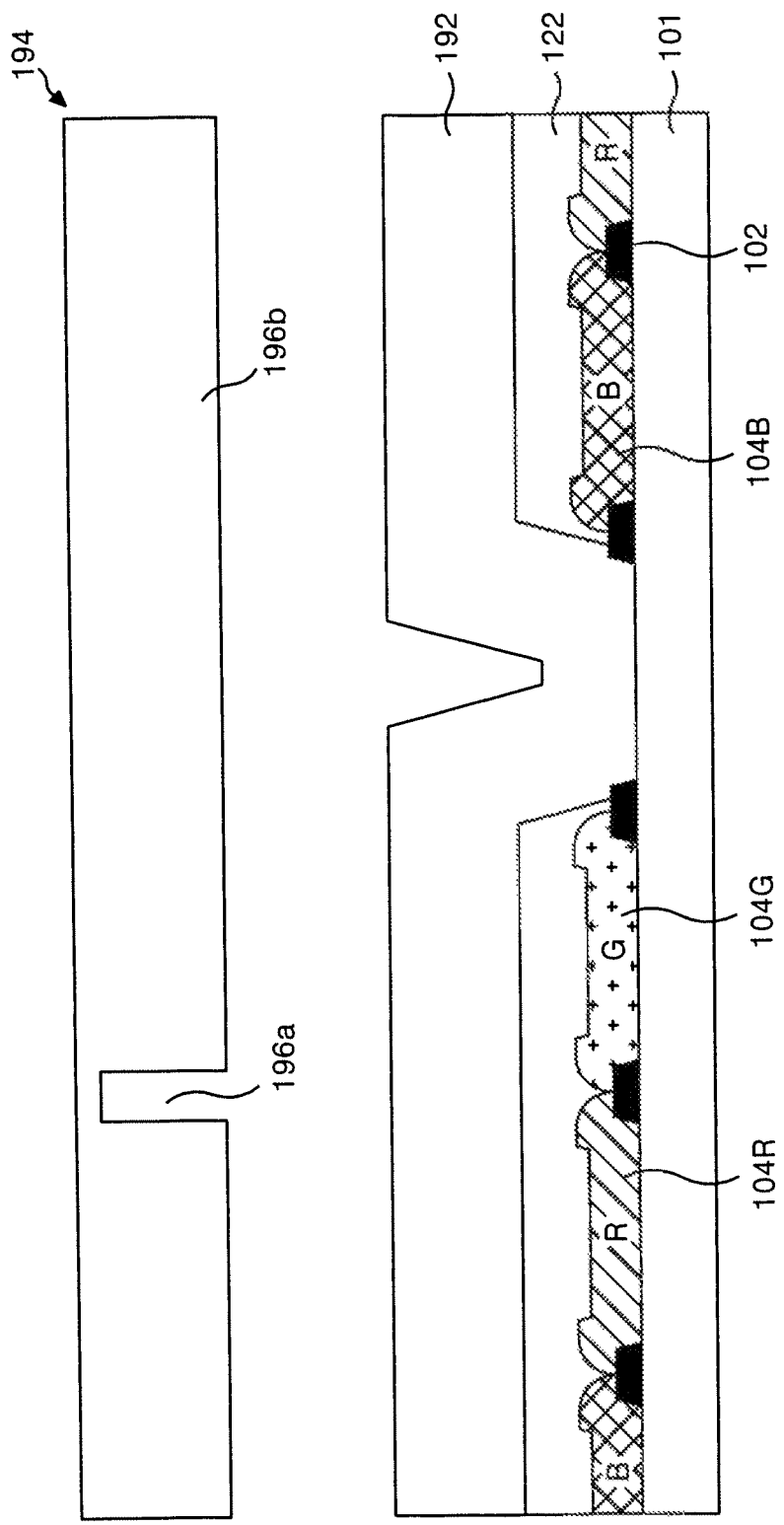
Figure 14F:
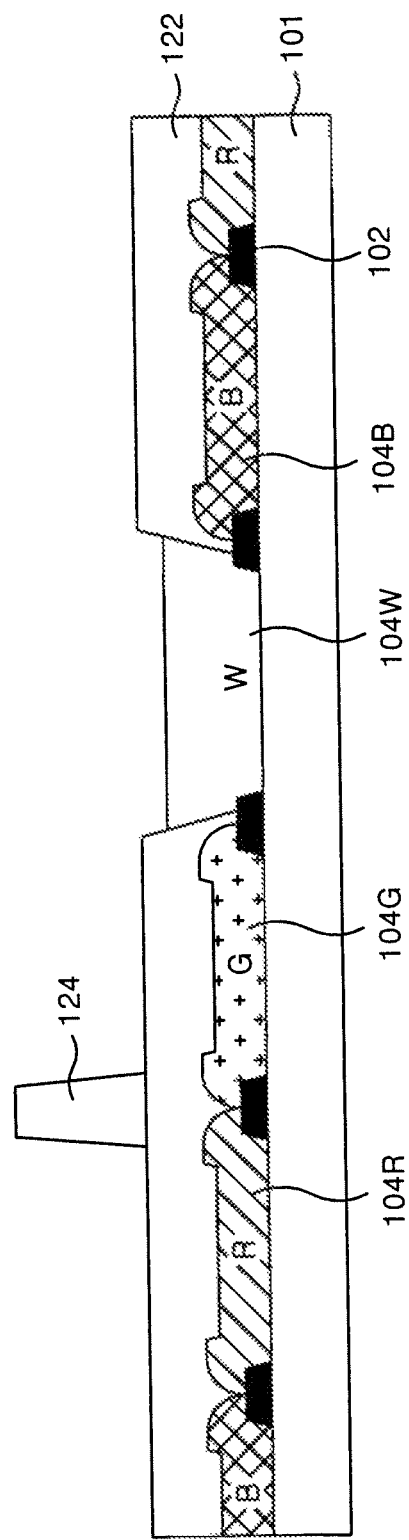

A highly hydrophilic second polymer 192, as shown in FIG. 14E, is printed over the entire surface of the upper substrate 101 on which the overcoat layer 122 is formed. A soft mold 194 having a groove 196a and a projected part 196b is aligned to the upper substrate 101 on which the highly hydrophilic second polymer 192 is formed. The groove 196a of the soft mold 194 corresponds to an area where a spacer is to be formed. The soft mold 194 is pressed into the highly hydrophilic second polymer 192 at about its own weight. The substrate 101 is baked at a temperature of about 130° C. or an ultraviolet UV ray is irradiated onto the highly hydrophilic second polymer 192 to soft-cure the highly hydrophilic second polymer 192. The UV intensity is in accordance with at least one of a photo initiator and a base material that are included in the highly hydrophilic second polymer 192. For instance, the UV intensity is about 2000~2500 m J/cm$^2$ if a base material included in the highly hydrophilic first polymer 198 is epoxy, and the UV intensity is about 500~1000 mJ/cm$^2$ if a base material is acrylic. The highly hydrophilic second polymer 192 moves into the groove 196a of the soft mold. As a result, as shown in FIG. 14F, the spacer 124 is formed with a pattern shape reversely transferred from the groove 196a of the soft mold. After the soft mold 194 is separated from the substrate 101, the substrate 101 is cured at about 200° C.

In this way, the fabricating method of the color filter array substrate according to the fourth embodiment of the present invention patterns the thin film of the color filter array substrate by use of the soft mold and the etch resist without using the photolithography process to form the white color filter and the spacer at the same time. Accordingly, no expensive exposure equipment is required and the process can be simplified. The precision is high and the process time is short, thereby improving the manufacturing yield.

Further, the liquid crystal display panel according to the present invention can be applicable to a TN mode in which a vertical electric field is formed by a common electrode formed on the upper substrate and a pixel electrode formed on the lower substrate, as well as to any IPS mode in which a horizontal electric field is formed by a common electrode and a pixel electrode formed on the lower substrate. The fabricating method of the color filter array substrate according to the present invention can form the white color filter, the spacer and the overcoat layer by using the soft mold in a vacuum stage. In this case, bubbles can be prevented from being generated when the soft mold is in contact with the highly hydrophilic polymer, which is the material of the white color filter, the spacer and the overcoat layer. Hereinafter, the color filter array substrate of the vertical alignment type liquid crystal display panel and the fabricating method thereof, and the thin film patterning apparatus according to a fifth embodiment of the present invention will be explained in detail in conjunction with FIGS. 15 to 17E.

Figure 15:
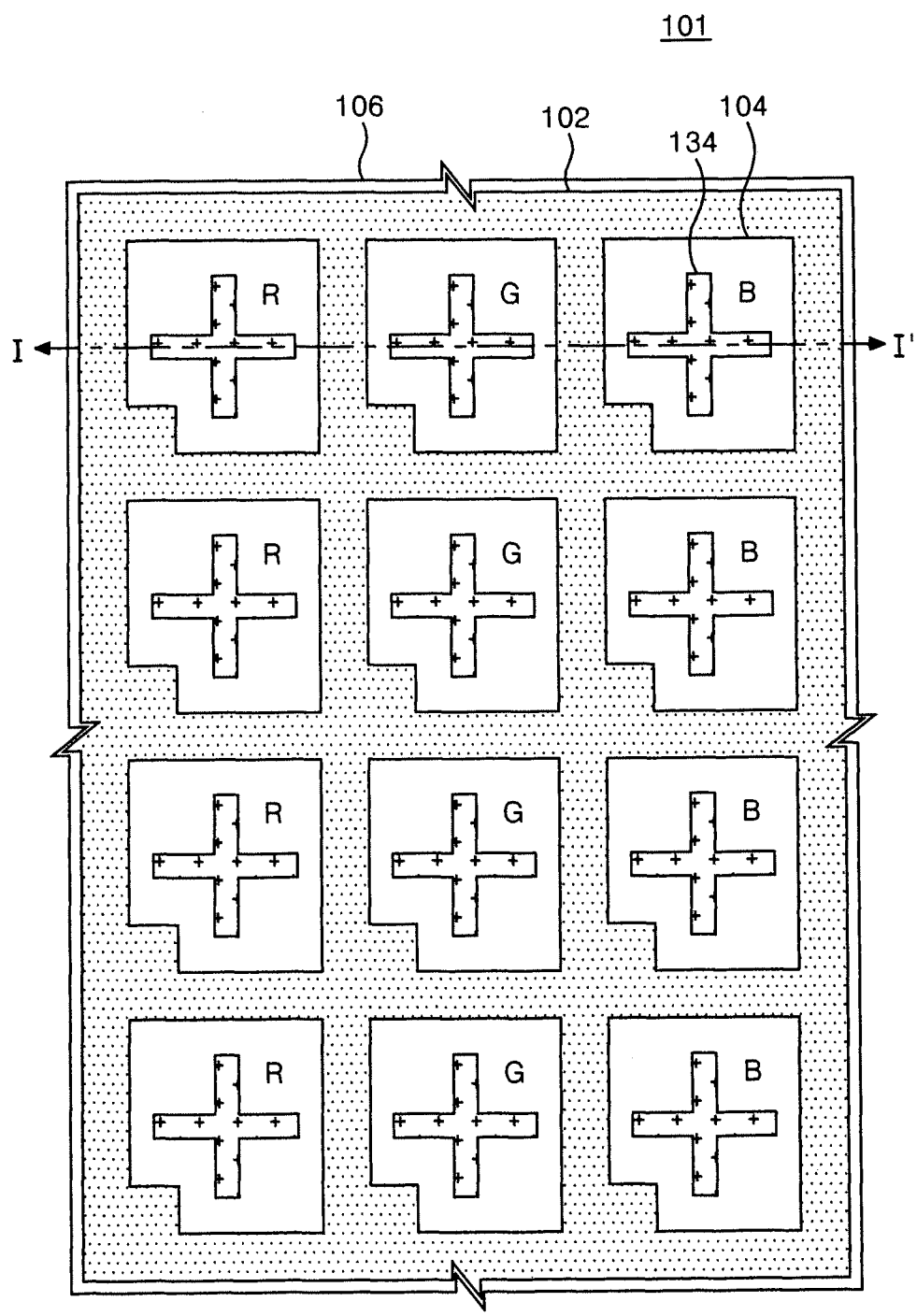
FIG. 15 is a plan view for a vertical alignment type liquid crystal display panel according to a fifth embodiment of the present invention.
Figure 16:
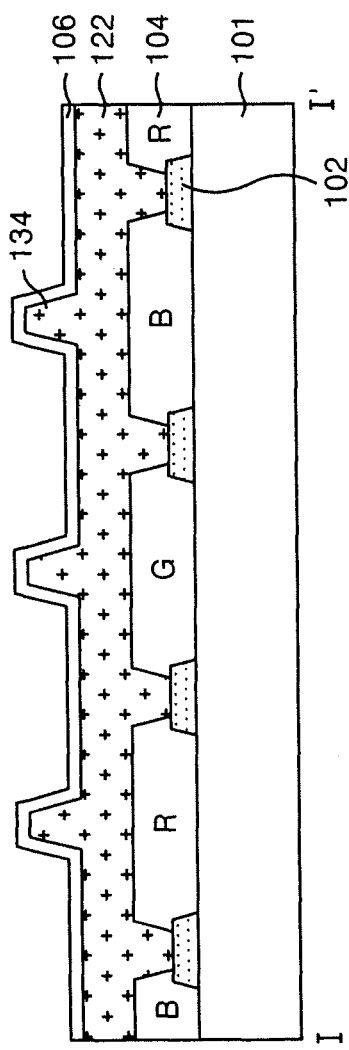
FIG. 16 is a cross-sectional view for the vertical alignment type liquid crystal display panel, taken along line "I-I'" in FIG. 15.

FIG. 15 is a plan view of a color filter array substrate of a vertical alignment type liquid crystal display panel according to a fifth embodiment of the present invention, and FIG. 16 is a cross-sectional view representing the color filter array substrate of the vertical alignment type liquid crystal display panel, taken along line "I-I'" of FIG. 15. Referring to FIGS. 15 and 16, the color filter array substrate according to the fifth embodiment of present invention includes a black matrix 102; red R, green G, blue B color filters 104; an overcoat layer 122 and a rib 134 formed on and integrated with the color filter 104; and a common electrode 106 formed to cover the rib 134, which are formed on an upper substrate 101. The black matrix 102 is formed on the upper substrate 101 in a matrix shape to define a plurality of cell areas where the color filters 104 are to be formed, and prevents light interference between adjacent cells. The black matrix 102 is formed to overlap an area of the thin film transistor array substrate except for a pixel electrode. For example, the pixel electrode overlaps the gate lines, the data lines and the thin film transistors of the thin film transistor array substrate. The black matrix 102 can be an opaque resin, such as carbon black, or an opaque metal, such as chrome (Cr) or chrome oxide (CrOx/Cr/CrOx, CrOx/Cr/CrSix).

The color filter 104 is formed in a cell area defined by the black matrix 102. The color filter 104 realizes red R, green G and blue B. The overcoat layer 122 is formed on the color filter 104 to compensate for the stepped difference between the color filter and the black matrix 102. The overcoat layer 122 can be a highly hydrophilic polymer. The highly hydrophilic polymer is a liquid pre-polymer, a liquefied polymer, or a high molecule with a structure where a material having hydrophilic radical is substituted by an acrylic system or epoxy system polymer chain which has high transmittance. Herein, the liquid pre-polymer includes an organic material, a binder and a photo initiator. The organic material is a material that has a repulsive force when in contact with the soft mold, a coloring degree not greater than 20 and a good transparency, such as poly ethylene glycol (PEG). The binder is of styrene acrylic monomer that styrene co-monomer with high adherence is added to the acrylic monomer.

A rib 134 is formed of the same material as the overcoat layer 122. The rib 134 makes the electric field, which is applied to the liquid crystal, distort so that the liquid crystal is arranged in symmetric directions centering on the rib 134. The common electrode 106 is formed on the whole surface of the upper substrate on which the overcoat layer 122 and the rib 134 are formed. A reference voltage for driving liquid crystal is applied to the common electrode 106. The color filter array substrate of the vertical alignment type liquid crystal display panel according to the fifth embodiment of the present invention is simultaneously formed of the same material as the overcoat layer 122 and the rib 134. Accordingly, the fabricating process is simplified and the manufacturing cost can be reduced.

Figure 17A:
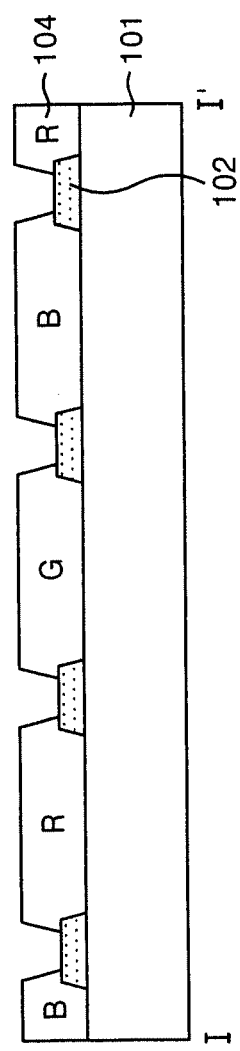
FIGS. 17A to 17E are cross-sectional views for a fabricating method of the vertical alignment type liquid crystal display panel shown in FIG. 16.

FIGS. 17A to 17E are cross-sectional views for a fabricating method of the color filter array substrate shown in FIG. 16. First, after an opaque resin or an opaque metal is spread over the upper substrate 101, the opaque resin or the opaque metal is patterned, thereby forming the black matrix 102 as shown in FIG. 17A. After red, green and blue resins are each spread over the upper substrate 101 where the black matrix 102 is formed, the red, green and blue resins are patterned, thereby forming the color filter.

Figure 17B:
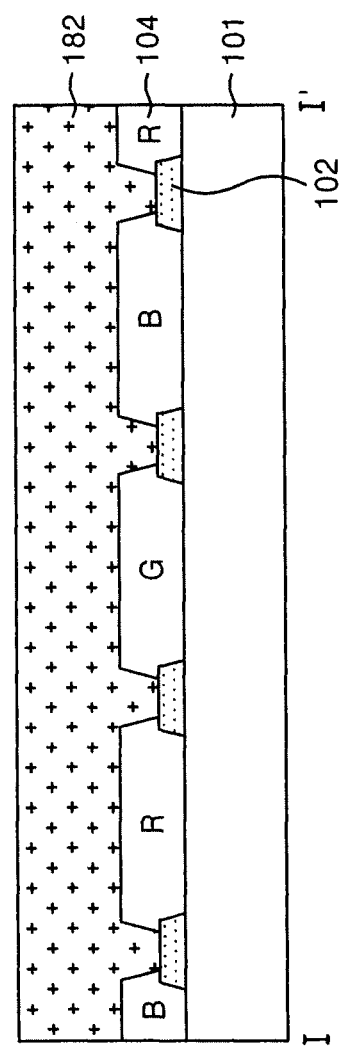
Figure 17C:
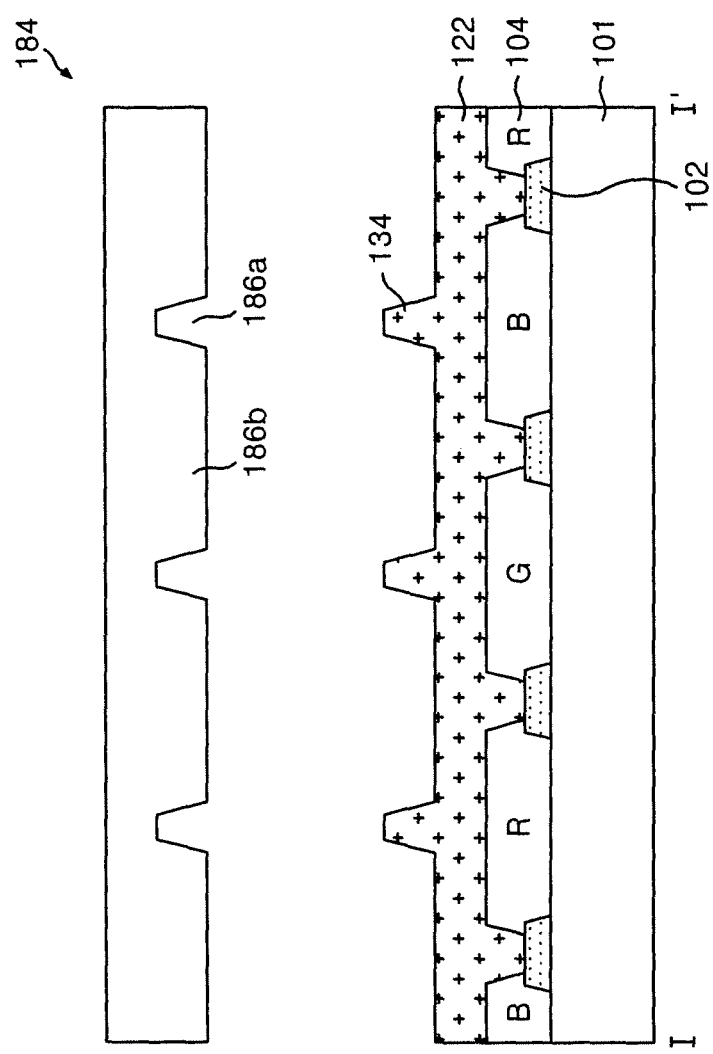
Figure 17D:
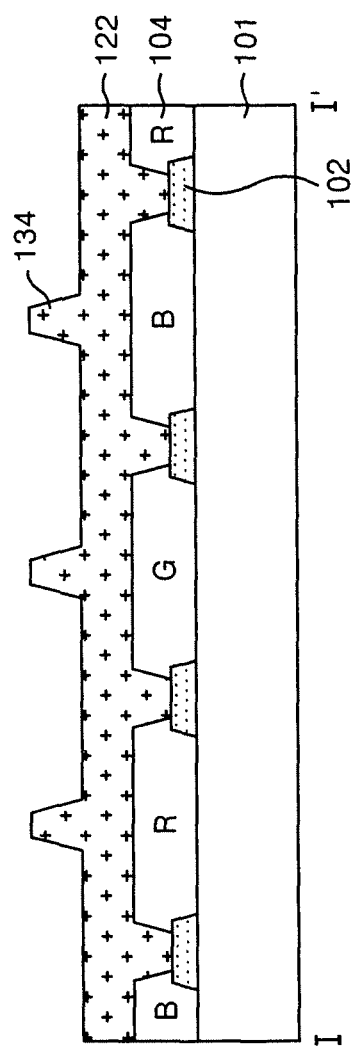

The highly hydrophilic polymer 182, as shown in FIG. 17B, is printed over the entire surface of the upper substrate 101 where the color filter 104 is formed, by a spin coating or slit coating method. The soft mold 184 with the groove 186a and the projected part 186b, as shown in FIG. 17C, is aligned to the upper substrate 101 where the highly hydrophilic polymer 182 is formed. The groove 186a of the soft mold corresponds to an area where the rib is to be formed. The soft mold 184 is formed of polydimethylsiloxane PDMS, polyurethane, cross-linked novolac resin and so on. The soft mold 184 is pressed into the highly hydrophilic polymer 182 at about its own weight. At this moment, the substrate 101 is baked at a temperature of about 130° C. or an ultraviolet UV ray is irradiated onto the highly hydrophilic polymer 182, thereby soft-curing the highly hydrophilic polymer 182. The UV intensity is in accordance with at least one of a photo initiator and a base material that are included in the highly hydrophilic polymer 182. For instance, the UV intensity is about 2000~2500 m J/cm$^2$ if a base material included in the highly hydrophilic polymer 182 is epoxy, and the UV intensity is about 500~1000 mJ/cm$^2$ if a base material is acrylic. The highly hydrophilic polymer 182 moves into the groove 186a of the soft mold by a capillary force, which is generated by a pressure between the soft mold 184 and the substrate 101, and a repulsive force between the soft mold 184 and the highly hydrophilic polymer 182. As a result, as shown in FIG. 17D, the rib 134, which has a pattern shape reversely transferred from the groove 186A of the soft mold, and the overcoat layer 122 which is in contact with the projected part 186b of the soft mold are formed. And then, after the soft mold 184 is separated from the substrate 101, the substrate 101 is cured at a temperature of about 150° C.

Figure 17E:
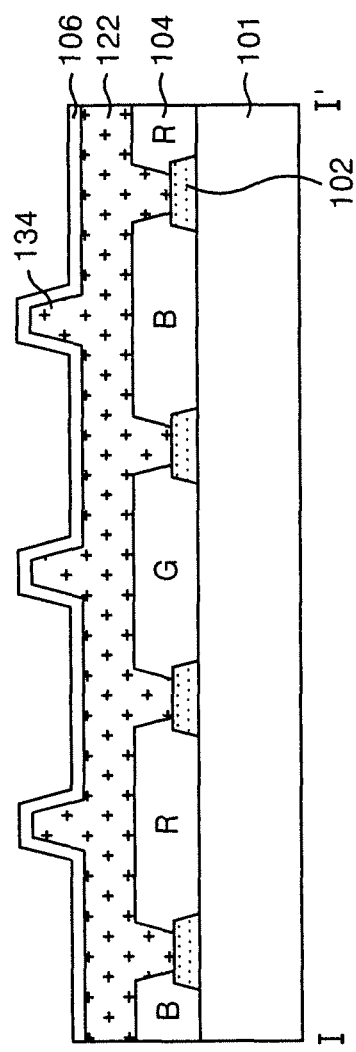

A transparent conductive film, such as ITO and IZO and so on, is deposited on the entire surface of the substrate 101 on which the rib 134 and the overcoat layer 122 are simultaneously formed, thereby forming the common electrode 106, as shown in FIG. 17E.

The fabricating method of the color filter array substrate according to the present invention simultaneously forms the overcoat layer 122 and the rib 134 using the soft mold without using a photolithography process. Accordingly, no expensive exposure equipment is required and the process is simple. The precision is high to enable the process time, thereby improving the manufacturing yield. On the other hand, the rib 134 and the overcoat layer 122 can be formed in a vacuum state by use of the soft mold 184. In this case, bubbles can be prevented from being generated when the soft mold 184 is in contact with the highly hydrophilic polymer which is the material of the rib 134 and the overcoat layer 122.

As described above, the fabricating method of the color filter array substrate according to the present invention forms the white color filter by use of the soft mold and the etch resist at the same time as at least any one of the spacer and the overcoat layer. Accordingly, no expensive exposure equipment is required, and the process can be simplified and the precision is high to enable the process time, thereby improving the manufacturing yield. Further, the color filter array substrate and the fabricating method thereof according to the present invention has the stepped difference between the white pixel area and the other pixel area to enable to prevent the picture quality deterioration such as stain. Further, the thin film patterning apparatus and the fabricating method of the color filter array substrate using the same according to the present invention simultaneously forms the overcoat layer and the rib, which adjusts the arrangement direction of the liquid crystal, by using the soft mold, but not using the photo process. Accordingly, the fabricating process is simplified to improve the manufacturing yield.

It will be apparent to those skilled in the art that various modifications and variations can be made in a thin film patterning apparatus and method of fabricating color filter array substrate using the same of the present invention without departing from the spirit or scope of the invention. Thus, it is intended that the present invention cover the modifications and variations of this invention provided they come within the scope of the appended claims and their equivalents.

What is claimed is:

1. A fabricating method of a color filter array substrate, comprising the steps of:
    forming a black matrix that defines pixel areas on a substrate;
    forming a color filter in the pixel areas;
    coating a transparent resin over the substrate where the color filter is formed;
    aligning a soft mold having a groove and a flat surface to an upper part of the substrate where the transparent resin is formed; and
    simultaneously forming an overcoat layer and a rib by molding the transparent resin with the soft mold, the rib being formed for each pixel area so that an arrangement direction of a liquid crystal is adjusted to be in a plurality of directions,
    wherein the overcoat layer has a flat surface corresponding to the flat surface of the soft mold, and
    wherein the rib overlaps the color filter and projects, from the flat surface of the overcoat layer, corresponding to the groove of the soft mold.

2. The fabricating method according to claim 1, wherein the step of simultaneously forming the rib and the overcoat layer includes the steps of:
    pressing the soft mold into the transparent resin; and
    forming the rib by having the transparent resin move into the groove, and forming the overcoat layer which is flat by having the flat surface of the soft mold in contact with the transparent resin.

3. The fabricating method according to claim 2, wherein the step of pressing the soft mold to the transparent resin includes the step of:
    pressing the soft mold into the transparent resin at about its own weight; and
    soft-curing the transparent resin by baking at a temperature of about 130° C. for about 10 minutes to 2 hours or by irradiating an ultraviolet ray onto the transparent resin.

4. The fabricating method according to claim 1, wherein the transparent resin is formed of any one of a liquid prepolymer and a liquefied polymer.

5. The fabricating method according to claim 1, wherein the soft mold includes any one of polydimethylsiloxane PDMS, polyurethane and cross-linked novolac resin.

* * * * *